US012150910B2

(12) United States Patent
Wade

(10) Patent No.: US 12,150,910 B2
(45) Date of Patent: Nov. 26, 2024

(54) TRIANGULAR PRISM-SHAPED BODY THERAPEUTIC DEVICE

(71) Applicant: Rodney Edward Wade, Heber City, UT (US)

(72) Inventor: Rodney Edward Wade, Heber City, UT (US)

(73) Assignee: Rodney Edward Wade

( * ) Notice: Subject to any disclaimer, the term of this patent is extended or adjusted under 35 U.S.C. 154(b) by 716 days.

(21) Appl. No.: 17/344,718

(22) Filed: Jun. 10, 2021

(65) Prior Publication Data

US 2021/0386609 A1 Dec. 16, 2021

Related U.S. Application Data

(60) Provisional application No. 63/049,713, filed on Jul. 9, 2020, provisional application No. 63/038,067, filed on Jun. 11, 2020.

(51) Int. Cl.
*A61H 1/00* (2006.01)
*A61H 1/02* (2006.01)

(52) U.S. Cl.
CPC ........... *A61H 1/0255* (2013.01); *A61H 1/008* (2013.01); *A61H 1/024* (2013.01); *A61H 1/0266* (2013.01)

(58) Field of Classification Search
CPC ...... A63B 21/002; A63B 23/04; A61G 15/00; A47C 17/86; A43B 7/16; A43B 17/02; A61H 1/0266; A61H 1/0237; A61H 15/00
See application file for complete search history.

(56) References Cited

U.S. PATENT DOCUMENTS

| | | | | |
|---|---|---|---|---|
| 10,130,836 B2 * | 11/2018 | Madion | A63B 21/4039 | |
| 2004/0121888 A1 * | 6/2004 | Williams | A63B 21/028 | 482/121 |
| 2011/0124473 A1 * | 5/2011 | Kole | A63B 23/10 | 482/79 |
| 2014/0088466 A1 * | 3/2014 | Hansen | A61G 13/009 | 482/129 |
| 2014/0221181 A1 * | 8/2014 | Pickett | G16H 20/30 | 434/247 |

* cited by examiner

*Primary Examiner* — Margaret M Luarca
*Assistant Examiner* — Sarah B Lederer
(74) *Attorney, Agent, or Firm* — Jeffrey K. Riddle; Riddle IP, PLLC

(57) ABSTRACT

A therapeutic system may include a triangular prism-shaped body, the triangular prism-shaped body including a first rectangle plane; a second triangular plane placed at a 90° angle relative to a first side of the first plane; a third plane rectangular placed at a 30° angle relative to a second side of the first plane; a fourth triangular plane placed at a 90° angle relative to a third side of the first plan; and a fifth rectangular plane place at a 60° angle relative to a fourth side of the first plane; a heel placement depression formed in the first rectangle plane; and a foot placement identifier formed on the third rectangular plane originating at the joint of the first rectangular plane and third rectangular plane and extending into the third rectangular plane.

20 Claims, 23 Drawing Sheets

TRIANGULAR PRISM-SHAPED BODY THERAPEUTIC DEVICE

TECHNICAL FIELD

The present disclosure relates to a physical therapy device. More specifically, the present disclosure relates to lower extremity physical therapy device used in stretching and exercising.

BACKGROUND

Physical therapy is performed by professionals on patients in order to eventually rehabilitate the physical strength, coordination, and flexibility of a patient. In some instances, the patient may be recovering from a surgery or had suffered from other ailments the limit the patient's ability to move. Physical therapy, therefore, is used to improve a patient's physical functions through physical examination, diagnosis, prognosis, physical intervention, rehabilitation and patient education.

SUMMARY

The various systems and methods of the present technology have been developed in response to the present state of the art, and in particular, in response to the problems and needs in the art that have not yet been fully solved by currently available physical therapy devices and procedures. The systems and methods of the present technology may provide a physical therapy device that provides for consistent stretching and exercising of a lower extremity of a patient especially where the physical therapist is not available to correct a patient's incorrect stretching or exercising.

To achieve the foregoing, and in accordance with the technology as embodied and broadly described herein, the therapy device may include a triangular prism-shaped body that includes a heel positioning recess and a leg positioning surface. The triangular prism-shaped body may also include a number of visual aids that tell the patient where to place the lower extremity on the triangular prism-shaped body for stretching and exercising.

These and other features and advantages of the present technology will become more fully apparent from the following description and appended claims, or may be learned by the practice of the technology as set forth hereinafter.

BRIEF DESCRIPTION OF THE DRAWINGS

Exemplary embodiments of the technology will become more fully apparent from the following description and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

DETAILED DESCRIPTION

Figure 1:
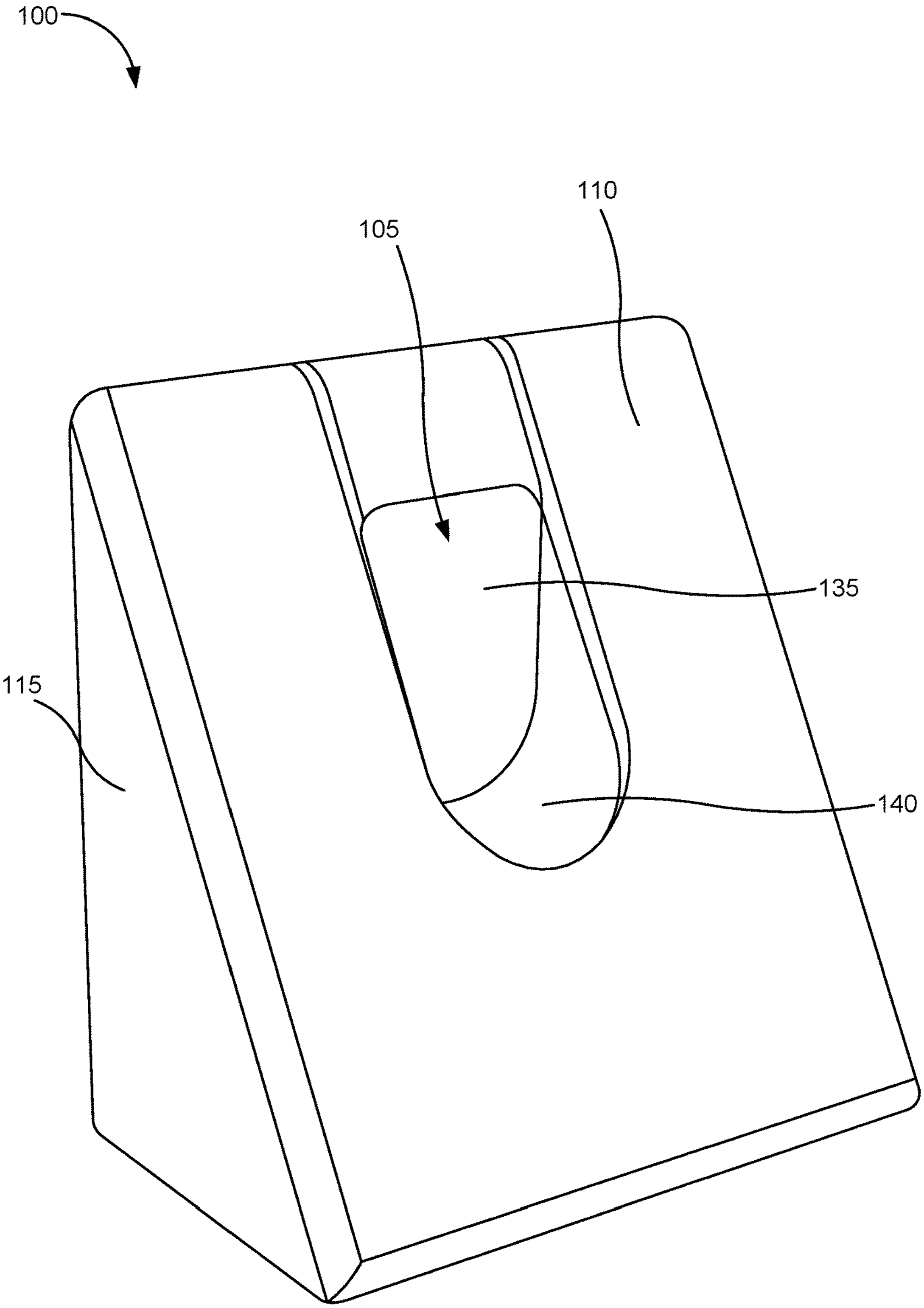
FIG. 1 is an oblique front view of a therapeutic device showing a first and second plane according to an embodiment of the present disclosure.

Exemplary embodiments of the technology will be best understood by reference to the drawings, wherein like parts are designated by like numerals throughout. It will be readily understood that the components of the technology, as generally described and illustrated in the figures herein, could be arranged and designed in a wide variety of different configurations. Thus, the following more detailed description of the embodiments of the apparatus, system, and method is not intended to limit the scope of the invention, as claimed, but is merely representative of exemplary embodiments of the technology.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Standard medical planes of reference and descriptive terminology may be employed in this specification. While these terms are commonly used to refer to the human body, certain terms are applicable to physical objects in general.

A standard system of three mutually perpendicular reference planes is employed. A sagittal plane divides a body into right and left portions. A coronal plane divides a body into anterior and posterior portions. A transverse plane divides a body into superior and inferior portions. A mid-sagittal, mid-coronal, or mid-transverse plane divides a body into equal portions, which may be bilaterally symmetric. The intersection of the sagittal and coronal planes defines a superior-inferior or cephalad-caudal axis. The intersection of the sagittal and transverse planes defines an anterior-posterior axis. The intersection of the coronal and transverse planes defines a medial-lateral axis. The superior-inferior or cephalad-caudal axis, the anterior-posterior axis, and the medial-lateral axis are mutually perpendicular.

Anterior means toward the front of a body. Posterior means toward the back of a body. Superior or cephalad means toward the head. Inferior or caudal means toward the feet or tail. Medial means toward the midline of a body, particularly toward a plane of bilateral symmetry of the body. Lateral means away from the midline of a body or away from a plane of bilateral symmetry of the body. Axial means toward a central axis of a body. Abaxial means away from a central axis of a body. Ipsilateral means on the same side of the body. Contralateral means on the opposite side of the body. Proximal means toward the trunk of the body. Proximal may also mean toward a patient or operator. Distal means away from the trunk. Distal may also mean away from a patient or operator. Dorsal means toward the top of the foot. Plantar means toward the sole of the foot. *Varus* means deviation of the distal part of the leg below the knee inward, resulting in a bowlegged appearance. Valgus means deviation of the distal part of the leg below the knee outward, resulting in a knock-kneed appearance. In the present specification, standard knee and leg anatomical terms may be employed with their ordinary and customary meanings.

FIG. 1 is an oblique front view of a therapeutic device 100 showing a first plane 110 and second plane 115 according to an embodiment of the present disclosure. The therapeutic device 100 may be in the shape of a triangular prism-shaped body. The different sides and edges of the therapeutic device 100 may be used for various stretches and exercises as described herein in order to allow a patient to consistently and correctly perform those stretches and exercises especially where a physical therapist is not watching and correcting the patient's stretching and exercising procedures.

The therapeutic device 100 may include a first plane 110 that is a plane generally in a rectangular shape. The first plane 110 may form a first side of the triangular prism-shaped body. The first plane 110 may be at a 90° angle relative to a second plane 115 of the triangular prism-shaped body of the therapeutic device 100. The second plane 115 may be in the shape of a triangle and, in a particular embodiment, a right triangle. The first plane 110 may also be at a 90° to a fourth plane (not shown) opposite the second plane 115. Similar to the second plane 115, the fourth plane (not shown) may be in the shape of a triangle and, in a particular embodiment, be in the shape of a right triangle. In the particular embodiment where the second plane 115 and the fourth plane are in the shape of a right triangle, the three angles of the right triangle may be a 90° angle, a 60° angle, and a 30° angle as indicated in other figures described herein.

In a particular embodiment, the first plane 110 may be positioned relative to a fifth plane (not show) at a 60°. The relative position of the first plane 110 to the fifth plane may be commensurate with the 60° angle of the right triangle shape of the second plane 115 and fourth plane (not shown) as described herein. Additionally, a third plane is formed between the first plane 110 and fifth plane. The third plane, in this particular embodiment, may be at a 90° angle relative to the fifth plane (not shown) and at a 30° angle relative to the first plane 110. The orientation of the first plane 110, third plane (not shown), and fifth plane (not shown) may each form a corresponding side of the triangular prism-shaped body between the second plane 115 and the fourth plane (not shown) as a translated copy of the second plane 115. Although specific details of the shapes and angles of the therapeutic device 100 are described herein, the present specification contemplates that the sides of the triangular prism-shaped body of the therapeutic device 100 may be placed at any angle relative to each other without going beyond the scope of the principles described herein. In these other embodiments, additional therapeutic advantages according to the principles described herein.

The first plane 110 may include a heel placement depression 105. The heel placement depression 105 may include a heel plane 135 and a heel cup 140. The heel plane 135 may be used by a patient to orient and rest the heel of the patient's foot against the heel plane 135 during certain orientations of the therapeutic device 100 as described herein. The heel cup 140 may be used by the patient to orient the patient's heel into the heel cup 140 during certain orientations of the therapeutic device 100 as described herein. The specific use of the heel placement depression 105 is descried herein and shown in FIGS. 12 and 19.

Figure 12:
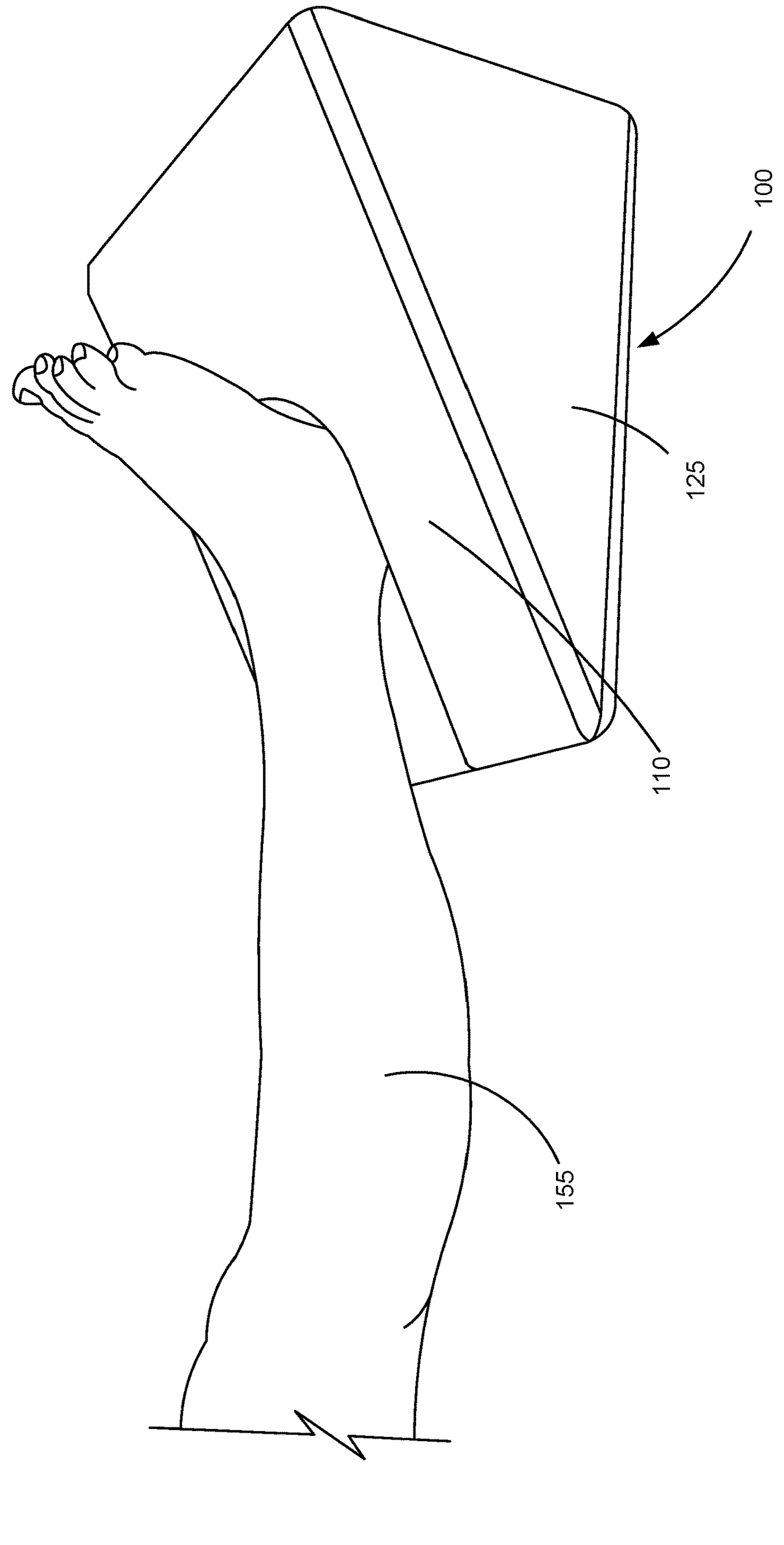
FIG. 12 is a side view of a patient implementing the therapeutic device in a first configuration according to an embodiment of the present disclosure.

During operation, the patient may use the heel placement depression 105 to, in an embodiment, conduct a knee extension exercise or what may be referred to as an extension hang. In this embodiment, the patient may sit on a surface such as a chair and extend the patients leg out and into the heel placement depression 105. In an embodiment, the therapeutic device 100 may be placed on another surface or chair so that the patient's leg is horizontal to the floor. Such an example orientation is shown in FIG. 12. The heel plane 135 allows the patient to rest the back of the patient's heel thereon or sole of the patient's foot thereon depending on the physical therapy, stretch, or exercise being conducted. The heel cup 140 prevents movement of the patient's foot, heel, and leg while, for example, this knee extension exercises are being conducted. The heel placement depression 105, therefore, prevents the patient from incorrectly executing the knee extension exercises and stretches along with other stretches and exercises described herein. Specifically, the dimensions of the heel placement depression 105 as well as the placement of the heel placement depression 105 into the therapeutic device 100 maintains the patient's hell, leg, foot, and knee at a specific location and these dimensions and orientation of the heel placement depression 105 are set to provide a specific physical therapy, stretch, and/or exercise to be conducted. Because the therapeutic device 100 may be taken home by a patient 155 and knee extension exercises may be conducted without a physical therapist monitoring for proper form during the knee extension exercises, the heel placement depression 105 may specifically prevent the patient from improperly executing the knee extension exercises and stretches by preventing the radial movement of the leg, for example. Additionally, the height of the heel placement depression 105 relative to the floor or surface may set the height of the patient's heel relative to the floor thereby The therapeutic device 100 may be made of a soft, light weight material that is easy to transport and orient especially by those patients who are recuperating from a recent surgery and are engaged in the rehabilitative stretches and exercises as described herein. In an embodiment, the therapeutic device 100 may be made of a foam material that is encased in a plastic or vinyl outer coating. In this embodiment, the foam material may be dipped into an uncured plastic of vinyl solution and allowed to dry thereby curing the plastic or vinyl. In an embodiment, the foam material is sprayed with an uncured plastic or vinyl solution and allowed to dry. In an embodiment, the therapeutic device 100 may be made of a foam material placed within a leather covering.

Figure 2:
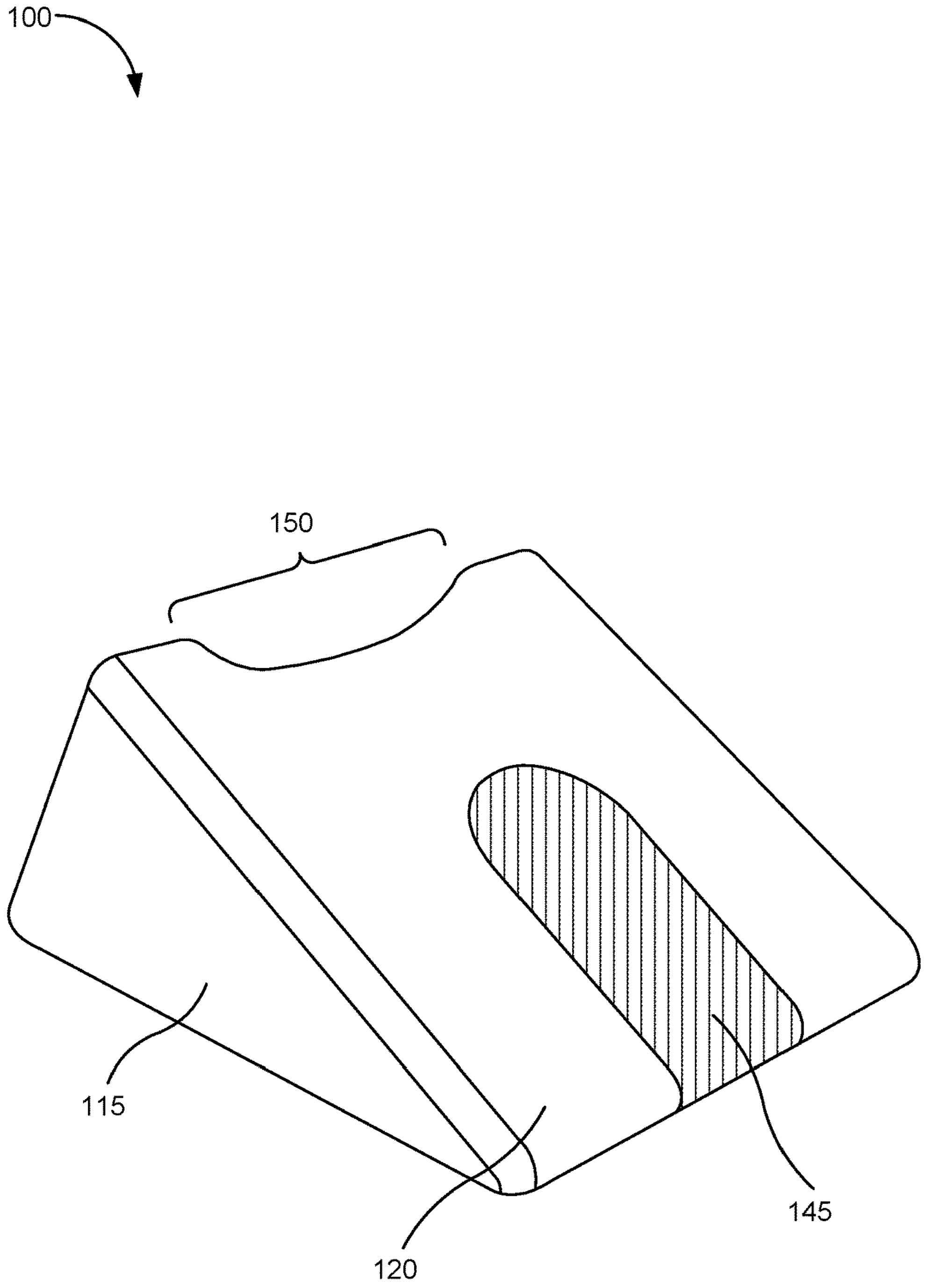
FIG. 2 is an oblique back view of a therapeutic device showing a second and third plane according to an embodiment of the present disclosure.
Figure 3:
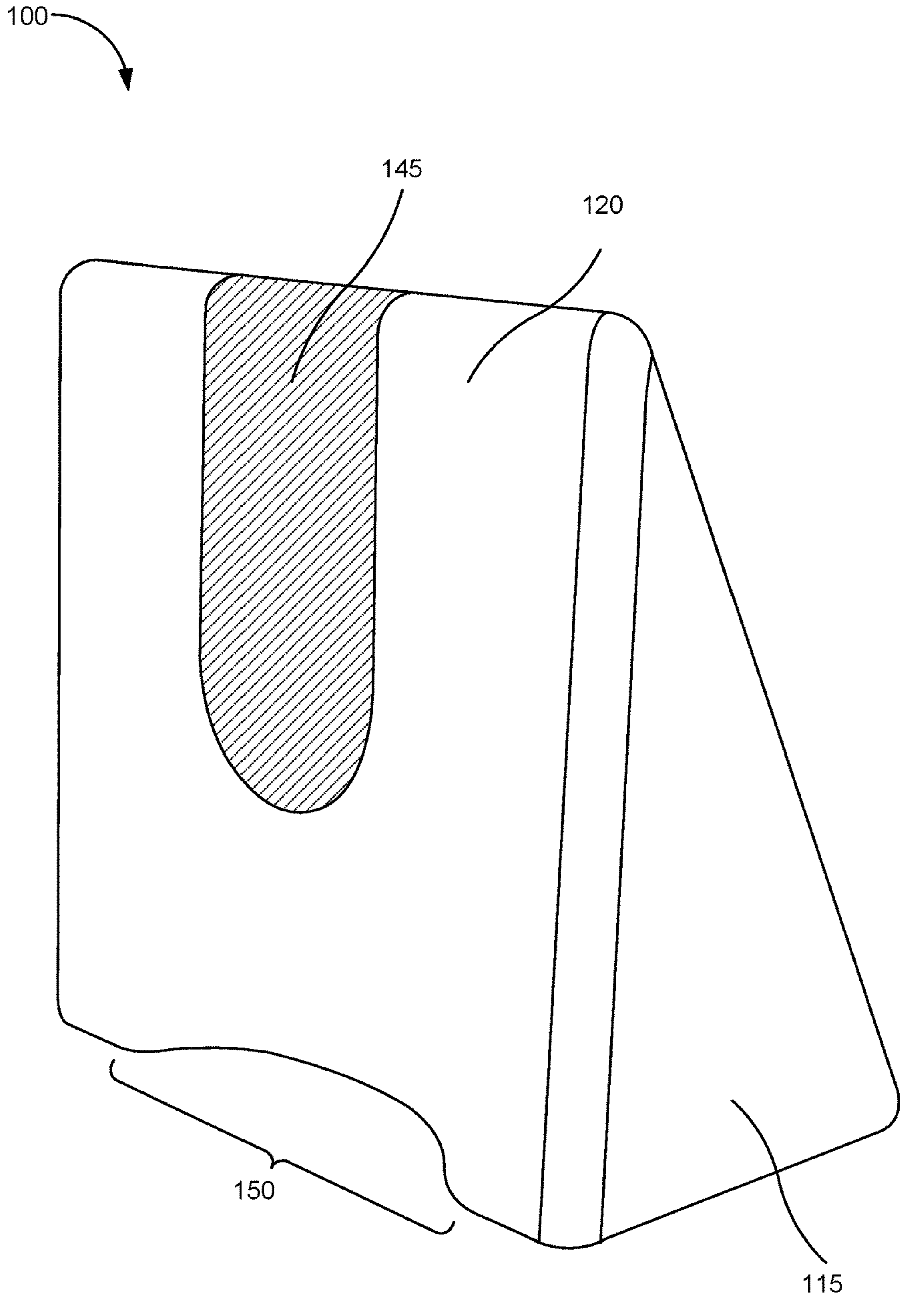
FIG. 3 is an oblique back view of a therapeutic device showing the second and third plane according to another embodiment of the present disclosure.

Turning to FIGS. 2 and 3, oblique back views of a therapeutic device 100 is shown showing a second plane 115 and third plane 120 according to an embodiment of the present disclosure. FIG. 2 specifically shows the orientation of the therapeutic device 100 to show the third plane 120 as described herein in connection with FIG. 1. The orientation of the therapeutic device 100 as shown in FIG. 2 places the heel placement depression (not shown in FIG. 2) on a flat surface during use of the therapeutic device 100.

The third plane 120 may include a foot placement identifier 145. The foot placement identifier 145 may be any visual and or textured aid that indicates to a patient where to place the patient's foot during such an orientation as shown in FIG. 2. In an embodiment, the foot placement identifier 145 may be of a color distinct from the color of the remaining portions of the therapeutic device 100. In an embodiment, the foot placement identifier 145 may be of a surface texture distinct from the texture of the remaining portions of the therapeutic device 100. In an embodiment, the foot placement identifier 145 may be colored red while the remaining surfaces of the therapeutic device 100 may be colored gray. In an embodiment, the foot placement identifier 145 may have a knurling texture while the remaining surfaces of the therapeutic device 100 may be smooth. The use of the foot placement identifier 145 by the patient is shown, in an example, in FIGS. 14, 15A, 15B, and 18, for example, and the third plane 120 may be used in other exercises and/or stretches as shown, for example, in FIGS. 13A, 13B, 17A, 17B, 20, and 21.

Figure 13A:
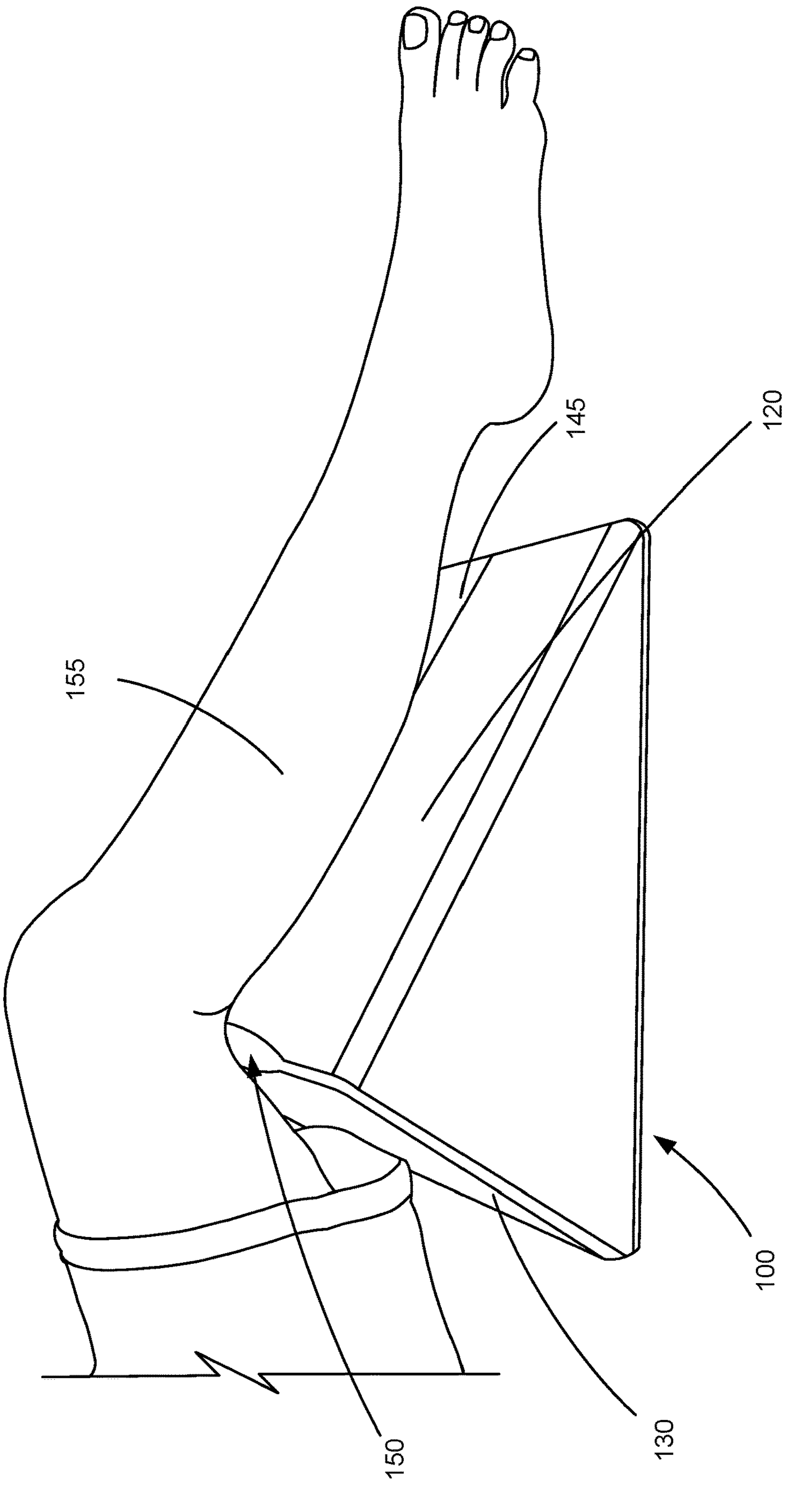
FIG. 13A is a side view of a patient implementing the therapeutic device in a first position of a second configuration according to an embodiment of the present disclosure.
Figure 13B:
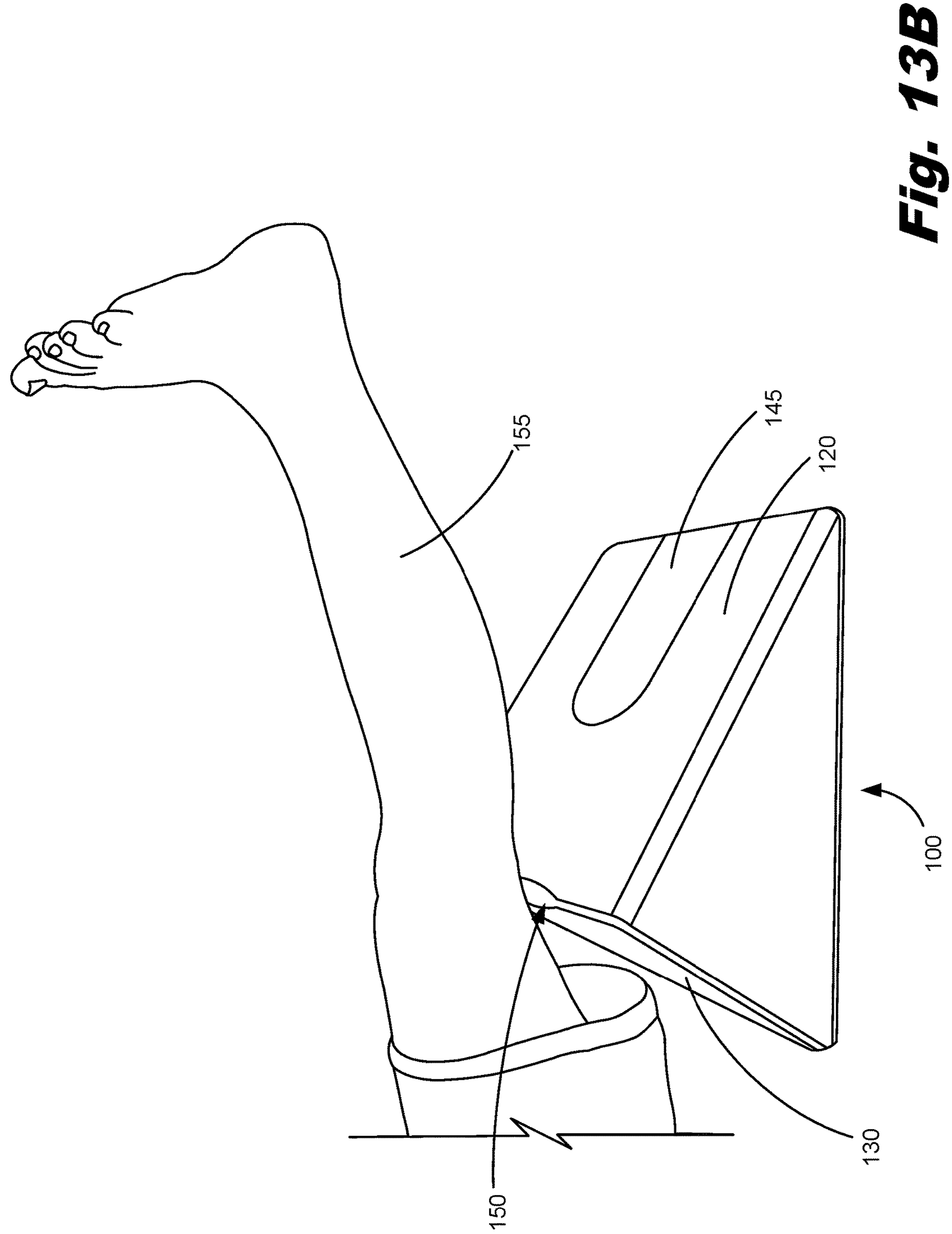
FIG. 13B is a side view of a patient implementing the therapeutic device in a second position of the second configuration of FIG. 13A according to an embodiment of the present disclosure.

FIGS. 2 and 3 also show the interface between the third plane 120 and the fifth plane (not shown) includes a leg depression 150. The leg depression 150 may be formed into the edge of the interface between the third plane 120 and the fifth plane (not shown) so that a posterior side of a leg or knee may be rested therein. The use of the leg depression 150, according to a number of embodiments, is shown in FIGS. 13A and 13B, for example. In an embodiment, the depression 150 may be used in connection with a knee flexion exercise or a hip flexor stretching exercise.

Figure 4:
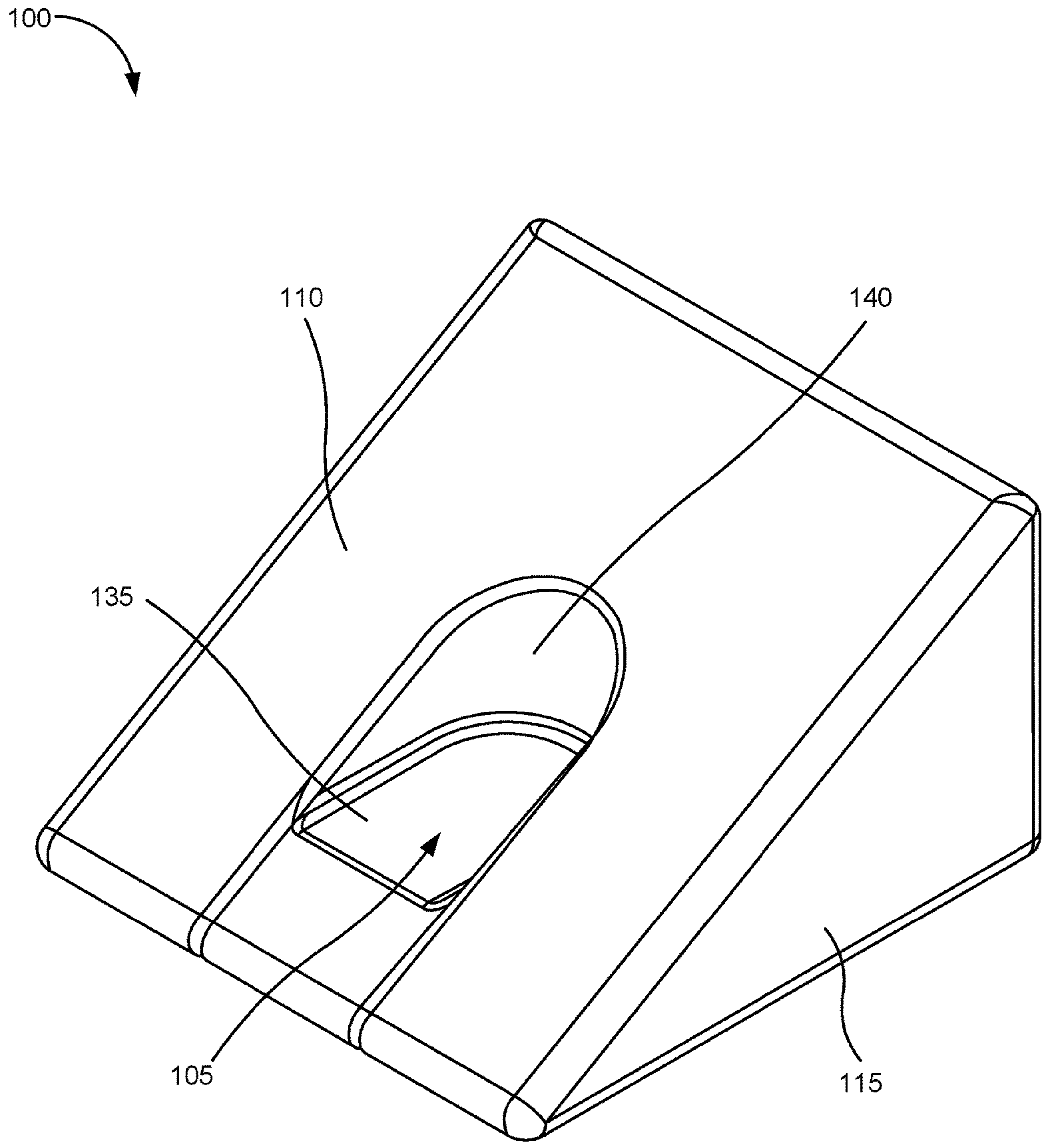
FIG. 4 is an oblique view of a therapeutic device showing a first and second plane according to another embodiment of the present disclosure.

FIG. 4 is an oblique front view of a therapeutic device showing a first plane 110 and second plane 115 according to another embodiment of the present disclosure. In contrast to the orientation of the therapeutic device 100 shown in FIG. 1, the orientation of the therapeutic device 100 show in FIG. 4 shows the orientation of the therapeutic device 100 as a patient uses the therapeutic device 100 during a knee extension exercise also shown in FIG. 12, for example described herein.

Figure 5:
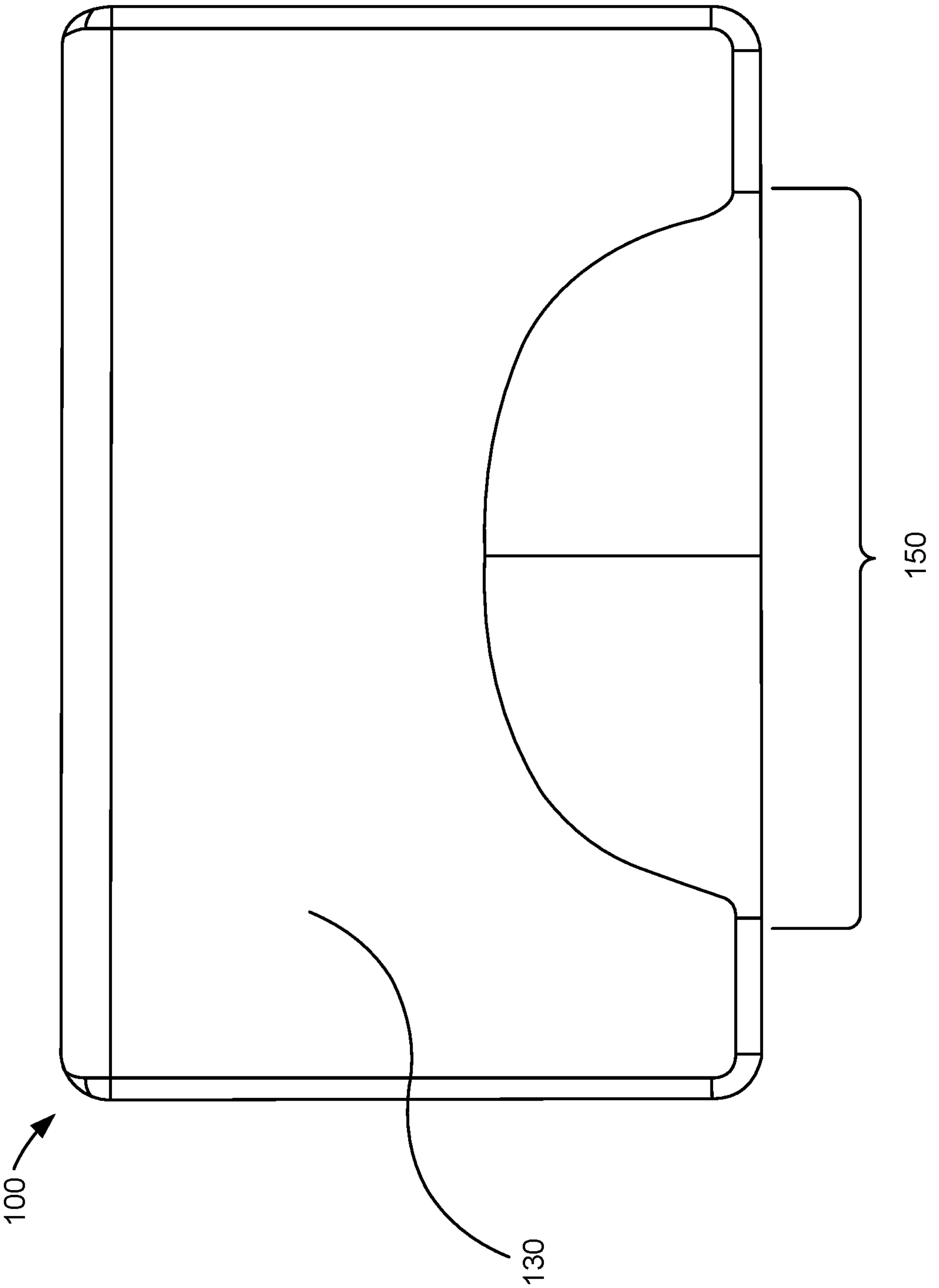
FIG. 5 is an elevational view of a therapeutic device showing a fifth plane according to another embodiment of the present disclosure.

FIG. 5 is an elevational view of a therapeutic device 100 showing a fifth plane 130 according to another embodiment of the present disclosure. The fifth plane 130 may be at a 90° angle relative to the third plane (not shown in FIG. 5, 120 in FIG. 3). The fifth plane 130 may also be at a 30° angle relative to the first plane 110, in an embodiment. In any embodiment herein, the corners between any number of planes may be rounded in order to render a more comfortable feel of the therapeutic device 100.

FIG. 5 further shows the leg depression 150 as described herein. In an embodiment, this leg depression 150 may be formed into the edge of the interface between the third plane (not shown) and the fifth plane 130 so that a posterior side of a leg or knee may be rested therein. The use of the leg depression 150, according to a number of embodiments, is shown in FIGS. 13A and 13B, for example. In an embodiment, the depression 150 may be used in connection with a knee flexion exercise or a hip flexor stretching exercise.

The dimensions of the leg depression 150 may vary depending on the comfort level the leg depression 150 provides to the patient. Additionally, the dimensions of the leg depression 150 may vary based on the ability of the therapeutic device 100 to prop up the patient's leg to perform the knee flexion exercise or a hip flexor stretching exercise described herein.

Figure 6:
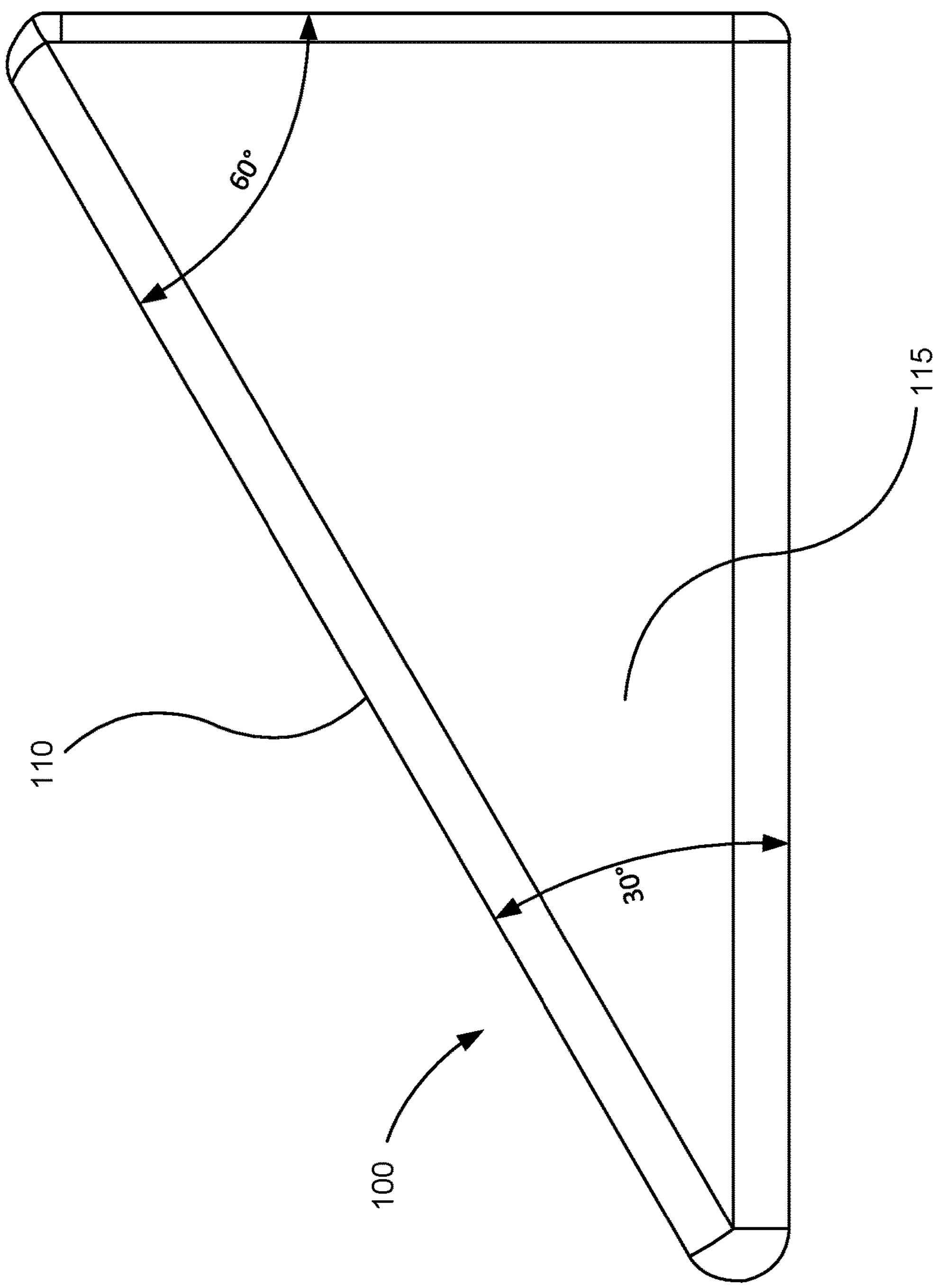
FIG. 6 is an elevational view of a therapeutic device showing a second plane according to another embodiment of the present disclosure.

FIG. 6 is an elevational view of a therapeutic device 100 showing a second plane 115 according to another embodiment of the present disclosure. It is understood that the second plane may be a mirror image of a fourth plane (e.g., 125, FIG. 8) and may have similar characteristics as described in connection with FIG. 6. As described herein, the first plane (not shown) may be at a 90° angle relative to a second plane 115 of the triangular prism-shaped body of the therapeutic device 100. The second plane 115 may be in the shape of a triangle and, in a particular embodiment, a right triangle. The first plane (not shown) may also be at a 90° to a fourth plane (not shown) opposite the second plane 115. Similar to the second plane 115, the fourth plane (not shown) may be in the shape of a triangle and, in a particular embodiment, be in the shape of a right triangle.

The triangle shape of the second plane 115 (and the fourth plane in an embodiment) may include a 90° angle at the corner of the second plane 115 where the second plane meets the fifth plane (not shown) and the third plane (not shown). This causes the fifth plane (not shown) and third plane (not shown) to be arranged perpendicularly 90° relative to each other.

In an embodiment, the first plane (not shown) is positioned relative to a fifth plane (not show) at a 60°. In this embodiment, another corner of the second plane 115 is accordingly formed into a 60° angle. The relative position of the first plane to the fifth plane may be commensurate with the 60° angle of the right triangle shape of the second plane 115 and fourth plane (not shown) as described herein.

Additionally, a third plane (not shown) is formed between the first plane and fifth plane. The third plane, in this particular embodiment, may be at a 90° angle relative to the fifth plane (not shown) and at a 30° angle relative to the first plane 110. In this embodiment, another corner of the second plane 115 is accordingly formed into a 30° angle. The orientation of the first plane, third plane, and fifth plane may each form a corresponding side of the triangular prism-shaped body between the second plane 115 and the fourth plane (not shown) as a translated copy of the second plane 115.

Figure 7:
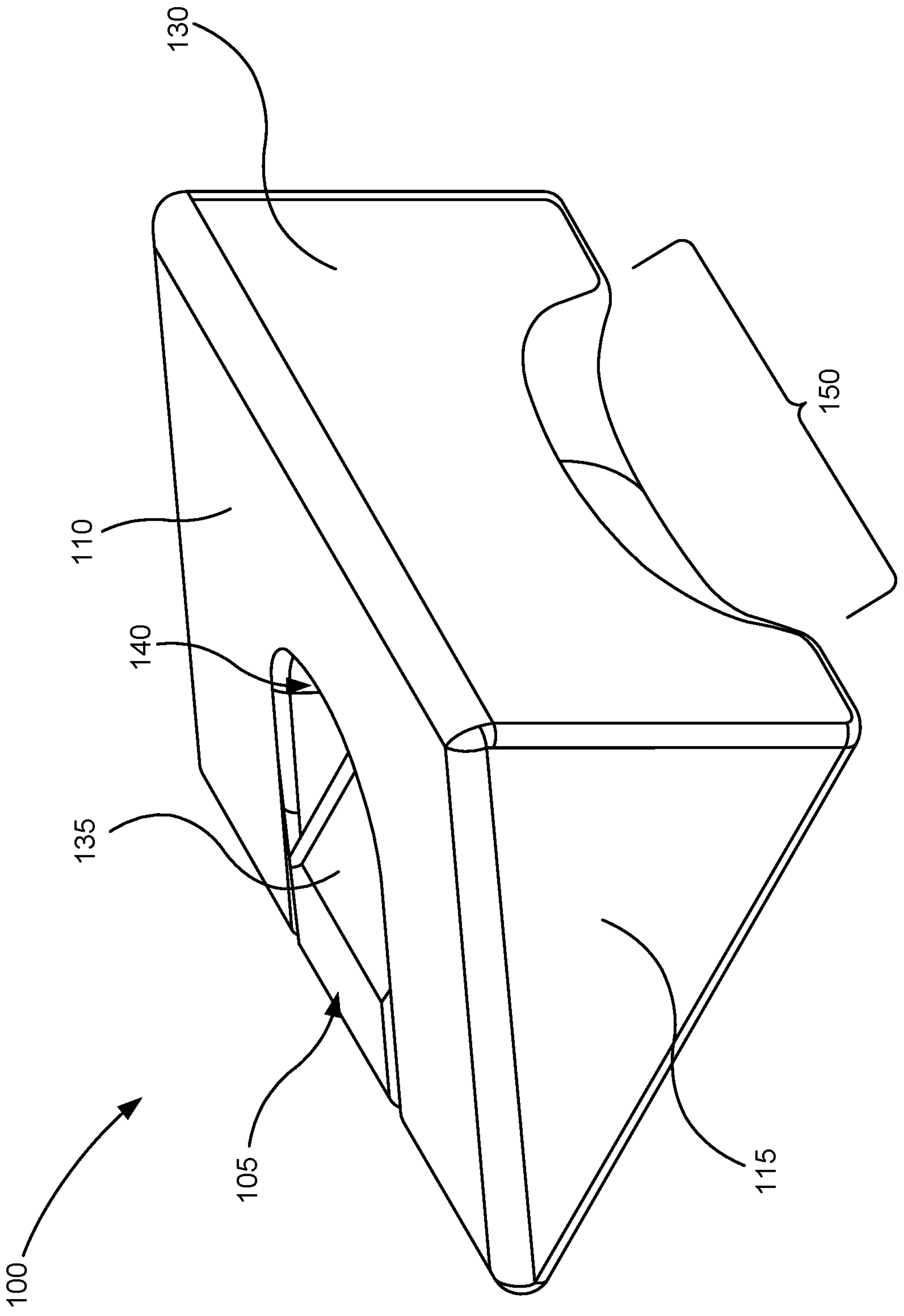
FIG. 7 is an oblique view of a therapeutic device showing a first, second, and fifth plane according to another embodiment of the present disclosure.

FIG. 7 is an oblique view of a therapeutic device 100 showing a first plane 110, second plane 115, and fifth plane 130 according to another embodiment of the present disclosure. A third plane (not shown) is facing down and abuts a surface in this orientation. Additionally, a fourth plane (not shown), mirroring the second plane 115 is formed on another side of the therapeutic device 100 opposite the second plane 115.

FIG. 7 also shows the leg depression 150 described herein. The leg depression 150 may be formed into the edge of the interface between the third plane 120 and the fifth plane (not shown) so that a posterior side of a leg or knee may be rested therein. The use of the leg depression 150, according to a number of embodiments, is shown in FIGS. 13A and 13B, for example. In an embodiment, the depression 150 may be used in connection with a knee flexion exercise or a hip flexor stretching exercise.

The therapeutic device 100 shown in FIG. 7 also shows that orientation of the heel placement depression 105 within the body of the therapeutic device 100. The heel placement depression 105 may include a heel plane 135 and a heel cup 140. The heel plane 135 may be used by a patient to orient and rest the heel of the patient's foot against the heel plane 135 during certain orientations of the therapeutic device 100 as described herein. The heel cup 140 may be used by the patient to orient the patient's heel into the heel cup 140 during certain orientations of the therapeutic device 100 as described herein. The specific use of the heel placement depression 105 is descried herein and shown in FIGS. 12 and 19.

Figure 8:
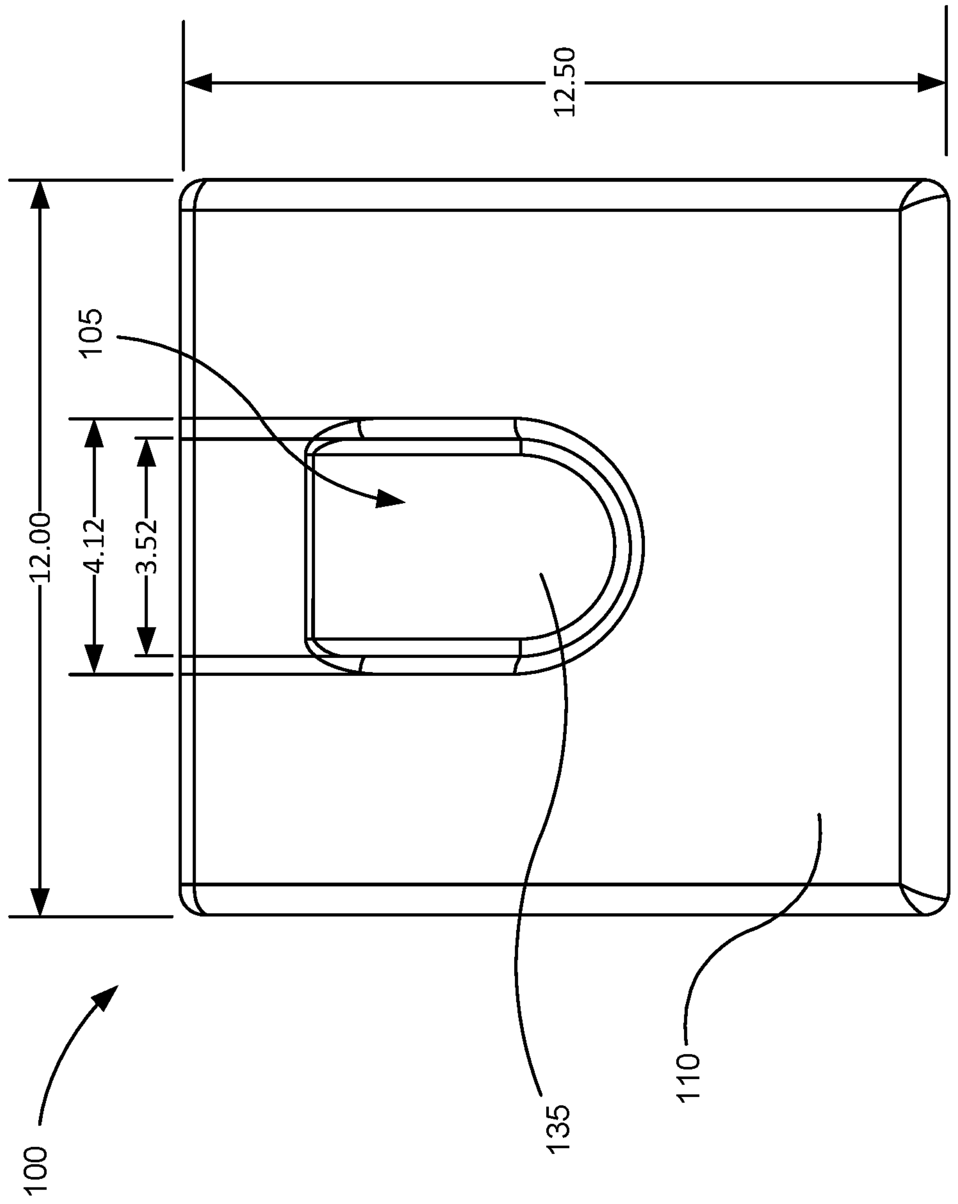
FIG. 8 is an elevational view of a therapeutic device showing a first plane according to another embodiment of the present disclosure.

FIG. 8 is an elevational top view of a therapeutic device 100 showing a first plane 110 according to another embodiment of the present disclosure. FIG. 8 shows example dimensions of the therapeutic device 100 and the heel placement depression 105 formed therein.

In an embodiment a width of the therapeutic device 100 may be 12 inches. Although the width of the therapeutic device 100 is descried as being 12 inches, the present specification contemplates that other dimensions may be used. The dimensions of the therapeutic device 100 including its width described herein may vary depending on the mobility of the therapeutic device 100 relative to the capabilities of the patient to carry the therapeutic device 100. Additionally, the dimensions of the therapeutic device 100 including its width may vary depending on the ability of the therapeutic device 100 to allow the patient to engage in the exercises, stretches, and other physical therapy actions to be engaged in as well as the height of the patient.

The therapeutic device 100 may have a length of 12.5 inches. The dimensions of the therapeutic device 100 including its length described herein may vary depending on the mobility of the therapeutic device 100 relative to the capabilities of the patient to carry the therapeutic device 100. Additionally, the dimensions of the therapeutic device 100 including its height may vary depending on the ability of the therapeutic device 100 to allow the patient to engage in the exercises, stretches, and other physical therapy actions to be engaged in as well as the height of the patient.

FIG. 8 further provides specific dimensions of the heel placement depression 105. In an embodiment, the heel placement depression 105 may have a base width of 3.52 inches that tapers out to a width of 4.12 inches along the walls of the heel placement depression 105 the further the walls are formed towards the first plane 110. This change in width of the heel placement depression 105 may allow the interior walls of the heel placement depression 105 formed therein to cup or hold the patient's heel and foot therein during the exercises, stretches, and other physical therapy actions performed.

Figure 9:
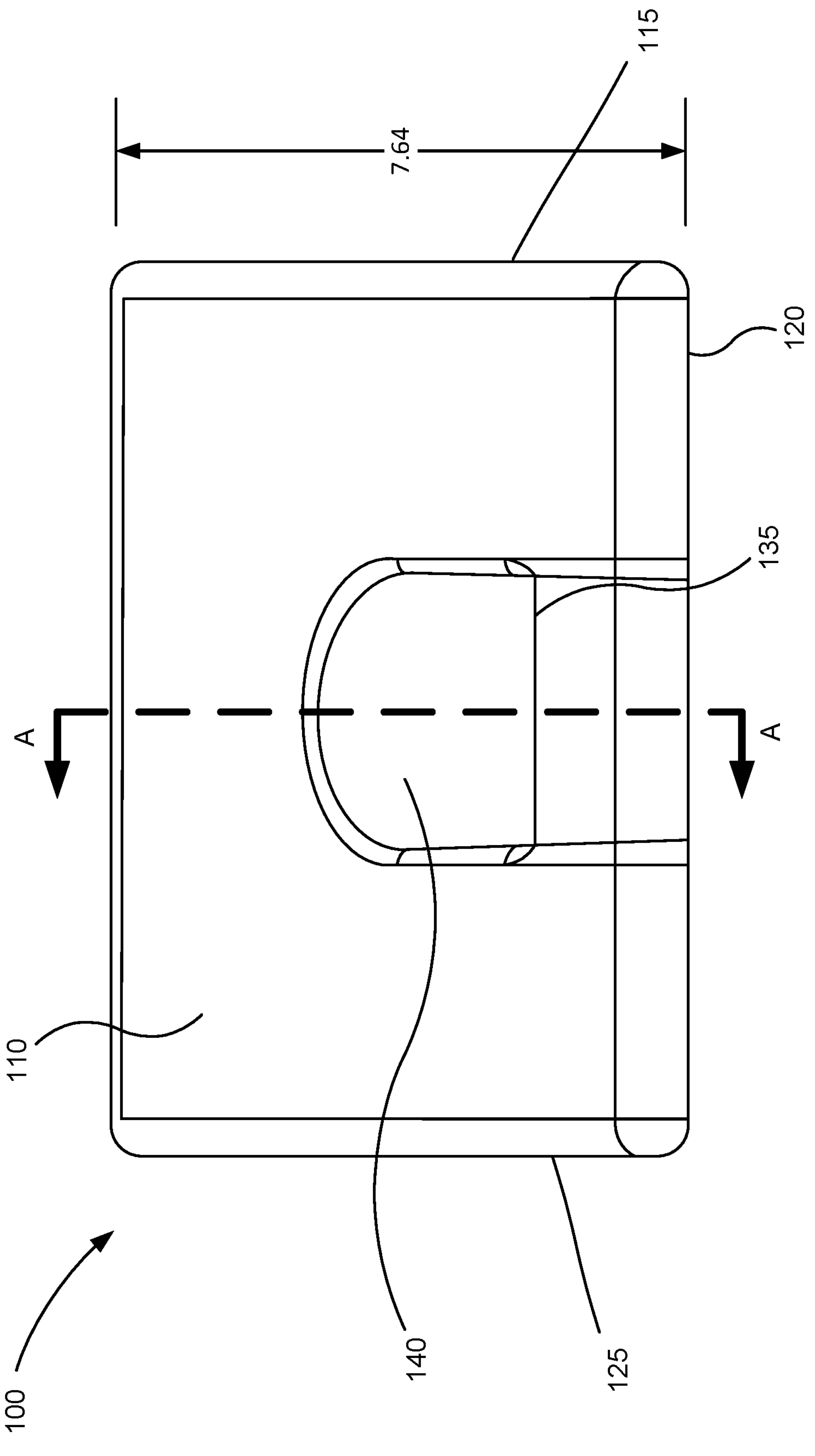
FIG. 9 is an elevational view of a therapeutic device showing a first plane and a section line according to another embodiment of the present disclosure.

FIG. 9 is an elevational view of a therapeutic device 100 showing a first plane 110 and a section line "A" according to another embodiment of the present disclosure. Again, FIG. 9 shows specific dimensions of the therapeutic device 100. However, it is understood that these dimensions may vary based on a specific physical therapy, stretch, and/or exercise to be conducted by the patient.

In this embodiment, the therapeutic device 100 may have a height of 7.64 inches. The height of the therapeutic device 100 may also vary depending on the height of the patient. In a specific example of an exercise, stretch, or physical therapy shown in FIGS. 13A and 13B, the height of the therapeutic device 100 may change the way the exercise, stretch, or physical therapy benefits the patient. Here, the patient's physical characteristics such as his or her height may determine the height the therapeutic device 100 has and multiple therapeutic devices 100 having carrying heights may be made available to the patient according to a prescription of the physical therapist, for example.

FIG. 9 also shows a different view of the heel placement depression 105 as described herein. As shown, the therapeutic device 100 includes a section placed in front of the heel placement depression 105 that has a slop similar to the slop formed by the first plane 110. The heel placement depression 105 is formed at a certain distance along that slop with the walls of the heel placement depression 105 including the heel cup 140 ending along this slop. In this embodiment, the heel plane 135 lies parallel to the third plane 120 such that a patient resting his or her foot within the heel placement depression 105 will be raised slightly above the surface of the ground when in use.

Figure 10:
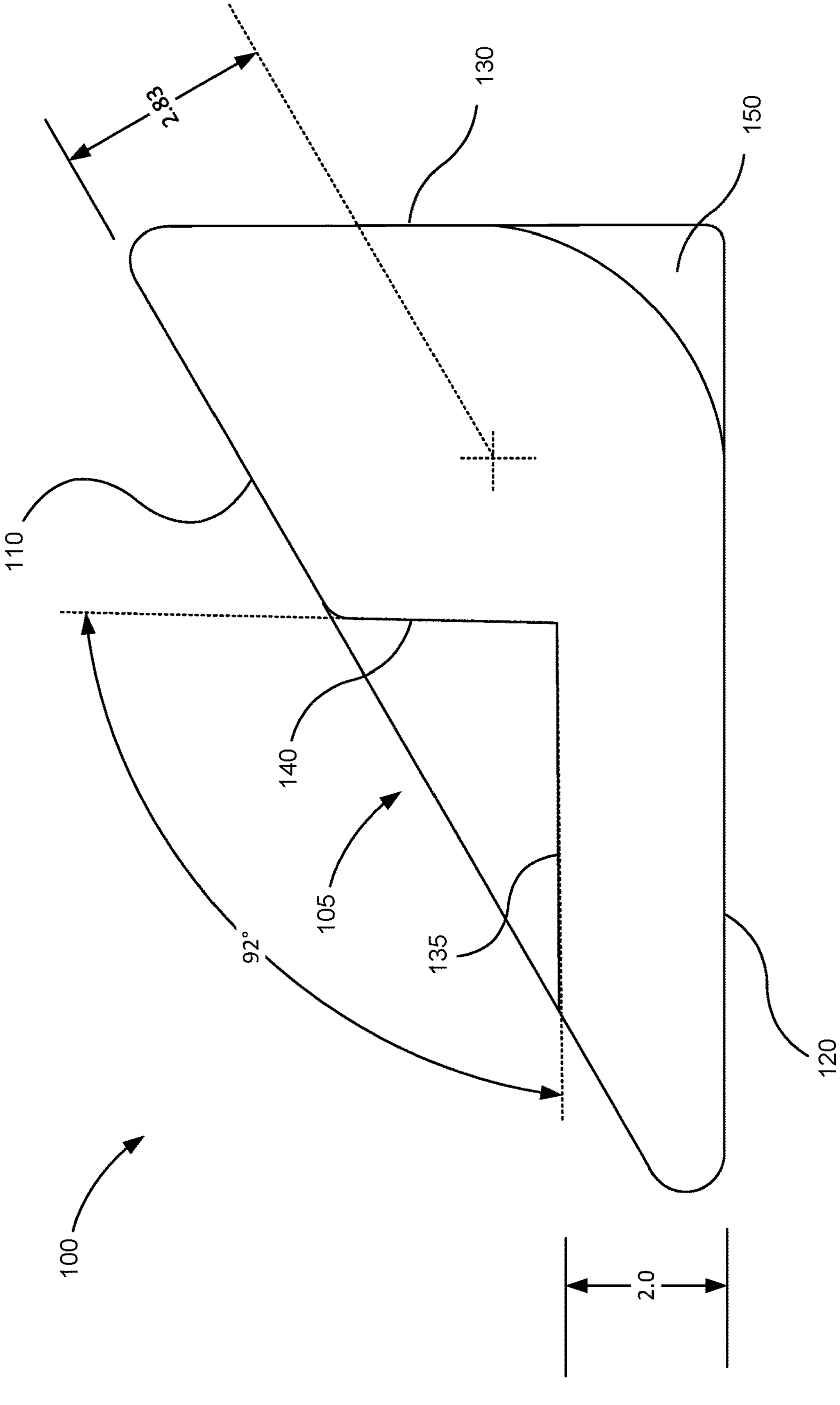
FIG. 10 is a side elevational view of a therapeutic device at a section plane along the section line of FIG. 9 according to another embodiment of the present disclosure.

FIG. 10 is a side elevational view of a therapeutic device 100 at a section plane "A" along the section line of FIG. 9 according to another embodiment of the present disclosure. FIG. 10 shows specific example dimensions of the heel placement depression 105 that includes the heel cup 140 and heel plane 135. In the embodiment shown in FIG. 10, the third plane 120 is placed to abut a surface used to rest the therapeutic device 100 on. The fifth plane 130 is perpendicular to the surface the therapeutic device 100 is resting on. In this configuration, the leg depression 150 is also partially abutting the ground and formed between the third plane 120 and the fifth plane 130.

FIG. 10 shows that the lowest most portion of the heel placement depression 105 has a heel plane 135 that is formed generally parallel to the third plane 120 and the surface on which the therapeutic device 100 is resting on. The heel plane 135 is formed at a height above the third plane 120. In this embodiment, the heel plane 135 is formed at 2 inches above the ground and from the third plane 120. Again, the dimensions and placement of the heel placement depression 105 and its heel plane 135 may vary depending on the exercise, stretch or other physical therapy the patient is to engage in. In a specific embodiment where the patient is to perform a stretch such that the patient's leg is made to be about horizontal to the floor as shown in FIG. 12.

The heel placement depression 105 may also have specific dimensions in order to hold and maintain a patient's foot and heel at a specific height and orientation to engage in an exercise, stretch, and other physical therapy actions. In an embodiment, the angle relative to the heel plane 135 and heel cup 140 may be 92° to accommodate for little movement of the patient's foot towards the fifth plane 130. A distance between a corner of the heel plane 135 and heel cup 140 and the first plane 110 may be 2.83 inches. Again, these dimensions of the heel placement depression 105 and the therapeutic device 100 may vary depending on the physical characteristics of the patient including the patient's height and body sizes.

Figure 11:
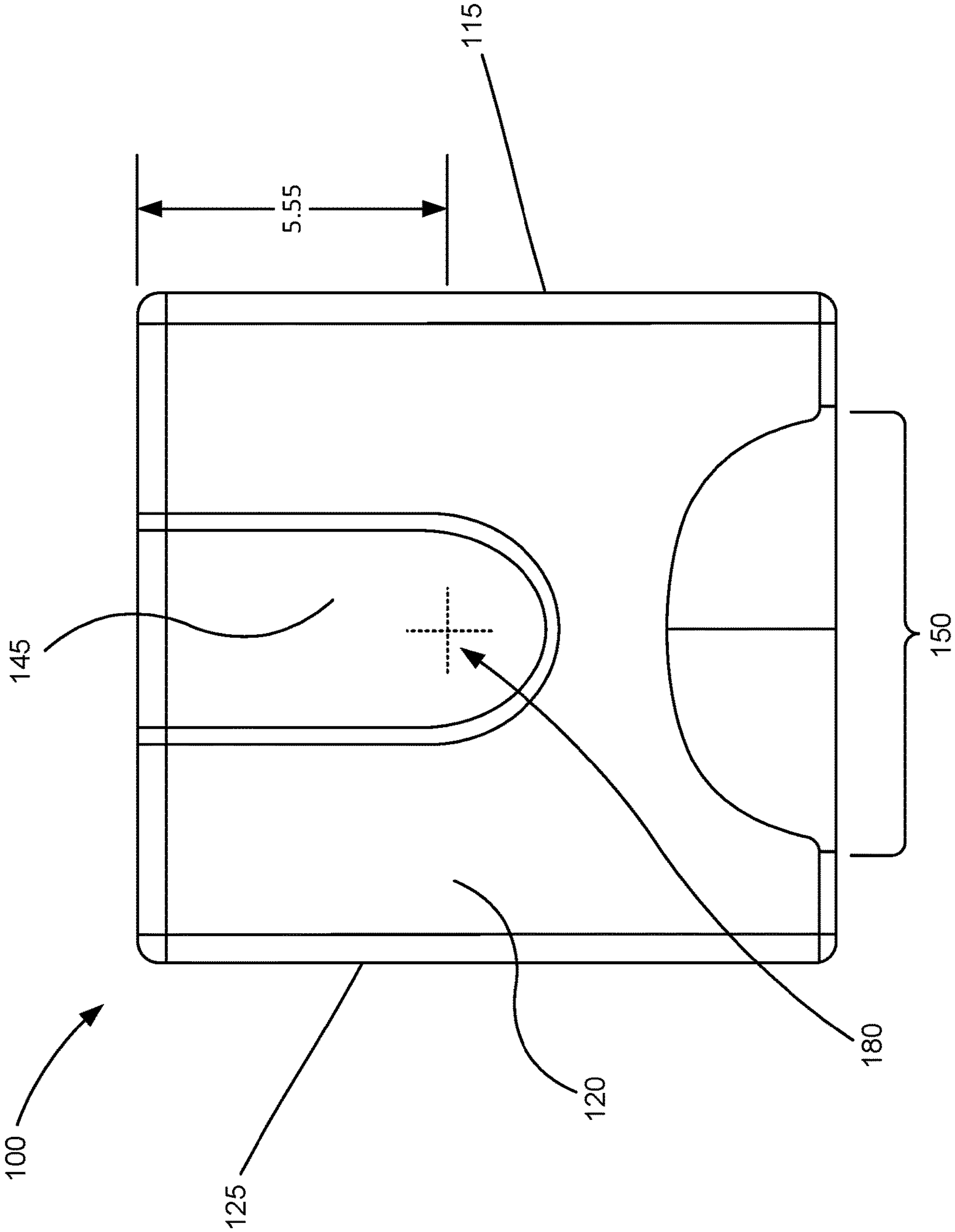
FIG. 11 is an elevational view of a therapeutic device showing a third plane according to an embodiment of the present disclosure.

FIG. 11 is an elevational view of a therapeutic device showing a third plane according to an embodiment of the present disclosure. FIG. 11 shows the third plane 120 with the foot placement identifier 145 defined on the third plane 120. In this view shown in FIG. 11, the second plane 115 is formed at a right side of the third plane 120 while a fourth plane 125 is formed at a left side of the third plane 120. The second plane 115 and fourth plane 125, due to the elevational view, are not entirely visible in FIG. 11.

FIG. 11 also shows the leg depression 150 as described herein. The leg depression 150 may be formed into the edge of the interface between the third plane 120 and the fifth plane (not shown) so that a posterior side of a leg or knee may be rested therein. The use of the leg depression 150, according to a number of embodiments, is shown in FIGS. 13A and 13B, for example. In an embodiment, the depression 150 may be used in connection with a knee flexion exercise or a hip flexor stretching exercise.

The third plane 120 may include a foot placement identifier 145. The foot placement identifier 145 may be any visual and or textured aid that indicates to a patient where to place the patient's foot during such an orientation as shown in FIG. 2. In an embodiment, the foot placement identifier 145 may be of a color distinct from the color of the remaining portions of the therapeutic device 100. In an embodiment, the foot placement identifier 145 may be of a surface texture distinct from the texture of the remaining portions of the therapeutic device 100. In an embodiment, the foot placement identifier 145 may be colored red while the remaining surfaces of the therapeutic device 100 may be colored gray. In an embodiment, the foot placement identifier 145 may have a knurling texture while the remaining surfaces of the therapeutic device 100 may be smooth. The use of the foot placement identifier 145 by the patient is shown, in an example, in FIGS. 14, 15A, 15B, and 18, for example, and the third plane 120 may be used in other exercises and/or stretches as shown, for example, in FIGS. 13A, 13B, 17A, 17B, 20, and 21.

The foot placement identifier 145 may be formed to direct the placement of a patient's foot in order to engage in these exercises, stretches, and other physical therapy actions correctly. The outline of the foot placement identifier 145 may be sized similar to the heel placement depression 105 formed on the opposite plane, the first plane 110. In a specific embodiment, a central point 180 within the foot placement identifier 145 may be defined based on the length of the foot placement identifier 145 and the curvature formed on the foot placement identifier 145. The distance between a top edge of the third plane 120 and the central point 180 may be 5.55 inches. Again, the size and dimensions of the foot placement identifier 145 may be varied based on the size of the patient's body in order to properly engage in the stretches, exercise, and other physical therapy actions as described herein.

In FIG. 12, a side view of a patient 155 implementing the therapeutic device 100 in a first configuration according to an embodiment of the present disclosure is shown. As described herein, the patient 155 may sit in the floor and place the therapeutic device 100 on the floor. In an alternative embodiment, the patient 155 may place the therapeutic device 100 on a chair and place the therapeutic device 100 on another surface such as another chair or ottoman. In this specific embodiment, the use of the chair and ottoman may alleviate a patient 155 from having to get back up off the floor if elderly or recovering from a major surgery for which the physical therapy is being conducted.

In either embodiment, the patient 155 may then extend the operative leg towards the therapeutic device 100 such that the patient's 155 heel is placed into the heel placement depression 105 with the back of the heel abutting the heel plane 135 and the bottom of the heel cupped within the heel cup 140 as described in connection with FIG. 1. During this time, the patient may perform a stretch such that the patient's leg is made to be about horizontal to the floor. During this time, the patient 155 is prevented from rotating his or her leg by the heel placement depression 105 and specifically the heel cup 140. This causes the patient 155 to consistently perform the knee extension exercise and stretch, for example, as recommended by physical therapists. In a specific example, the patient 155 may be directed by a physical therapist to place the patient's 155 foot into the heel placement depression 105 as described. The patient 155 may then place a force at the knee of the patient 155. Because the heel placement depression 105 is formed into the therapeutic device 100 with a portion of the therapeutic device 100 formed between the heel placement depression 105 and the floor, the patient's 155 leg is slightly raised above the ground. This allows for a slight deformation of the patient's 155 leg toward the ground. In an alternative embodiment, the patient 155 may be directed by the physical therapist to place a certain amount of weight on the knee or slightly superior relative to the knee joint. The placement of the weight or the force on the knee may be held for a prescribed time period according to the physical therapist's instructions and directions. In an embodiment, the placement of the weight or force on the knee may be repeated for a number of prescribed times for or a number of prescribed sets for a number of prescribed sessions per day according to the physical therapist's prescription, instructions, and directions.

As descried herein, the therapeutic device 100 may also be used for exercising the patient's 155 quad muscles (e.g., quadriceps femoris muscles). With FIG. 2 in mind and looking now at FIGS. 13A and 13B, such a quad muscle exercise with use of the therapeutic device 100 is shown. Is should be appreciated that although FIGS. 13A and 13B describe the use of the therapeutic device 100 for a quad muscle exercise, other types of exercises or stretches may be conducted by the patient 155 such as a knee strengthening and terminal knee extension (e.g., supine extension). FIG. 13A is a side view of a patient 155 implementing the therapeutic device 100 in a first position of a second configuration (e.g., in position for the quad exercises) according to an embodiment of the present disclosure while FIG. 13B is a side view of a patient implementing the therapeutic device in a second position of the second configuration of FIG. 6 according to an embodiment of the present disclosure.

During operation of the therapeutic device 100 in FIGS. 13A and 13B, the patient 155 may sit in a chair or other surface such as a floor and place the therapeutic device 100 under the knee of the patient 155. The interface between the third plane 120 and fifth plane 130 may contact the posterior side of the patient's 155 knee with the patient's 155 leg abutting the third plane 120 in a resting position. As described herein, the depression 150 may indicate to the patient 155 where the anterior surface of the knee is to be placed.

Once the patient 155 has placed the anterior side of the patient's 155 knee in the depression 150, the patient 155 may begin to raise the patient's 155 leg up so that the leg, or a lower portion of the leg, is horizontal to the floor as shown in FIG. 13B. According to the shape of the therapeutic device 100, the range of movement of the patient's 155 leg may be 30°. This is because the first plane 110 abuts the surface and the angle of the first plane 110 relative to the third plane 120 is 30°. In this orientation, the therapeutic device 100 follows certain after-surgery exercising protocols by restricting the patient 155 from translating or extending the leg to only a final 30° extension.

The depression 150, in this embodiment, acts as a fulcrum to allow the patient to complete this knee extension exercise appropriately and without continual supervision from the physical therapist. Additionally, the patient 155 may complete this exercise in a comfortable environment such as at home without that supervision of the physical therapist. In an embodiment, this knee extension exercises as shown in FIGS. 13A and 13B may be completed prior to other relatively difficult knee extension exercises being executed by the patient 155. The movement of the leg as described in connection with FIGS. 13A and 13B may be conducted for a number of times as prescribed by a physical therapist. In an embodiment, the movement of the leg as described in connection with FIGS. 13A and 13B may be repeated for a number of prescribed times for a number of prescribed sets for a number of prescribed sessions per day according to the physical therapist's prescription.

Figure 14:
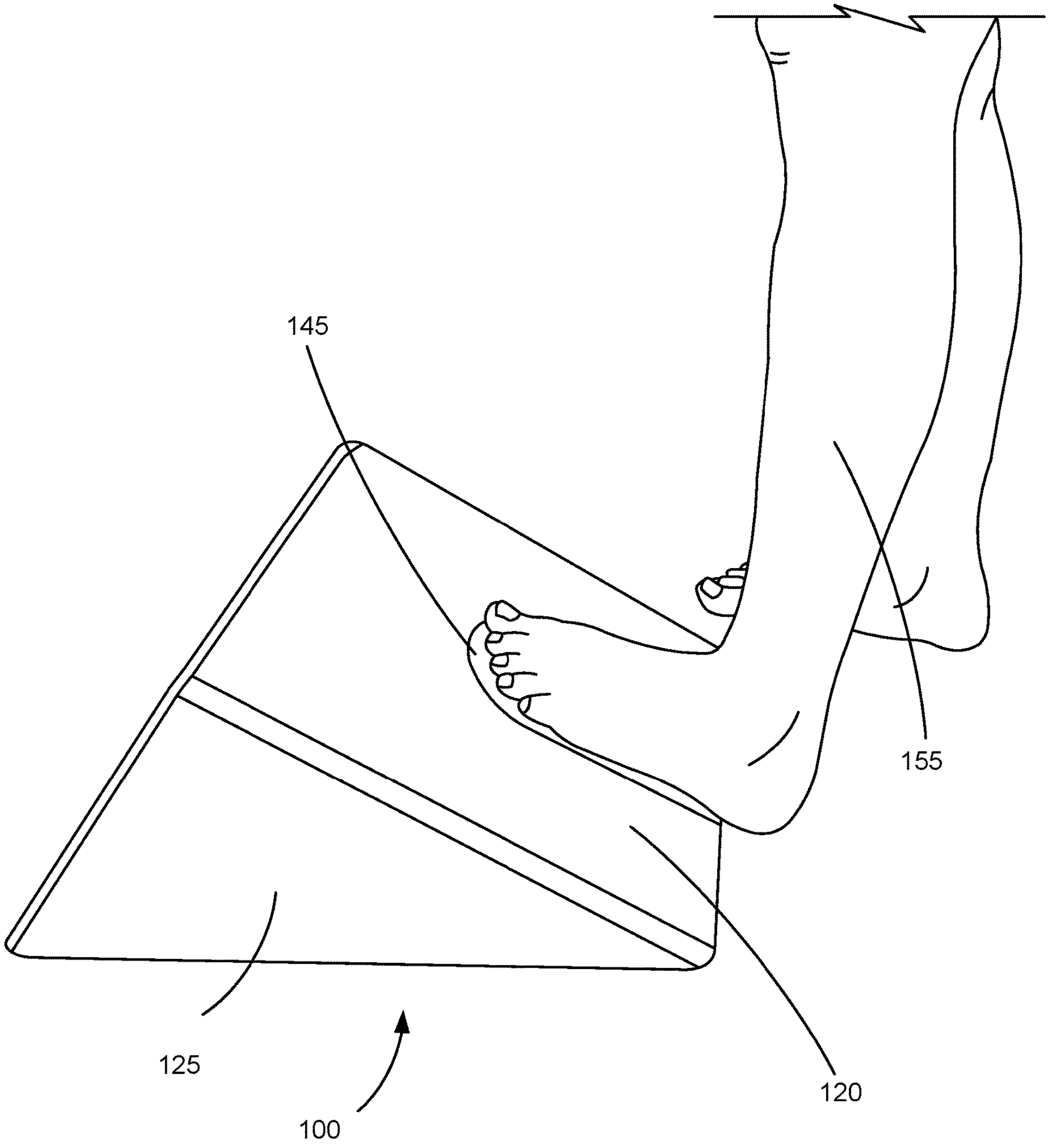
FIG. 14 is a side view of a patient implementing the therapeutic device in a first position of a third configuration according to an embodiment of the present disclosure.

As described herein in connection with FIG. 2, the therapeutic device 100 may also be used for stretching the patient's 155 calf muscles (gastrocnemius muscles) and hamstrings. With FIG. 2 in mind and looking now at FIG. 14, a patient 155 has positioned his or her foot on the foot placement identifier 145 defined on the third plane 120. As described herein, the foot placement identifier 145 may be any visual or tactile indicator such as a different color or texture showing the patient 155 where to place the patient's 155 foot on the third plane 120. In FIG. 14, the fourth plane 125 is viewable with the fifth plane 130 formed at a 90° angle relative to the third plane 120 and fourth plane 125 as described herein.

The angle of deflection of the patient's 155 foot from the floor surface is, in an embodiment, 30°. This is because the first plane 110 is made to abut the surface of the floor and the angle between the first plane 110 and the third plane 120 is 30°. Although the present specification describes this specific angle between the first plane 110 and third plane 120, the present specification contemplates that other angles may be used without going beyond the scope of the principles described herein.

During this exercise and stretch shown in FIG. 14, the patient 155 may advance his or her upper body forward towards the direction of the patient's 155 toes. By doing so the patient 155 may stretch his or her hamstrings and calf muscles (e.g., gastrocnemius muscles). In an embodiment, this stretch may be conducted by the patient 155 keeping the sole of his or her foot on the foot placement identifier 145, turning slightly out from the placed foot, and leaning forward towards the therapeutic device 100 until the stretch is felt in the calf muscles. This may allow for the patient 155 to engage in lower leg exercises with a musculature prepared for such activities especially after a knee or leg surgery.

Figure 15B:
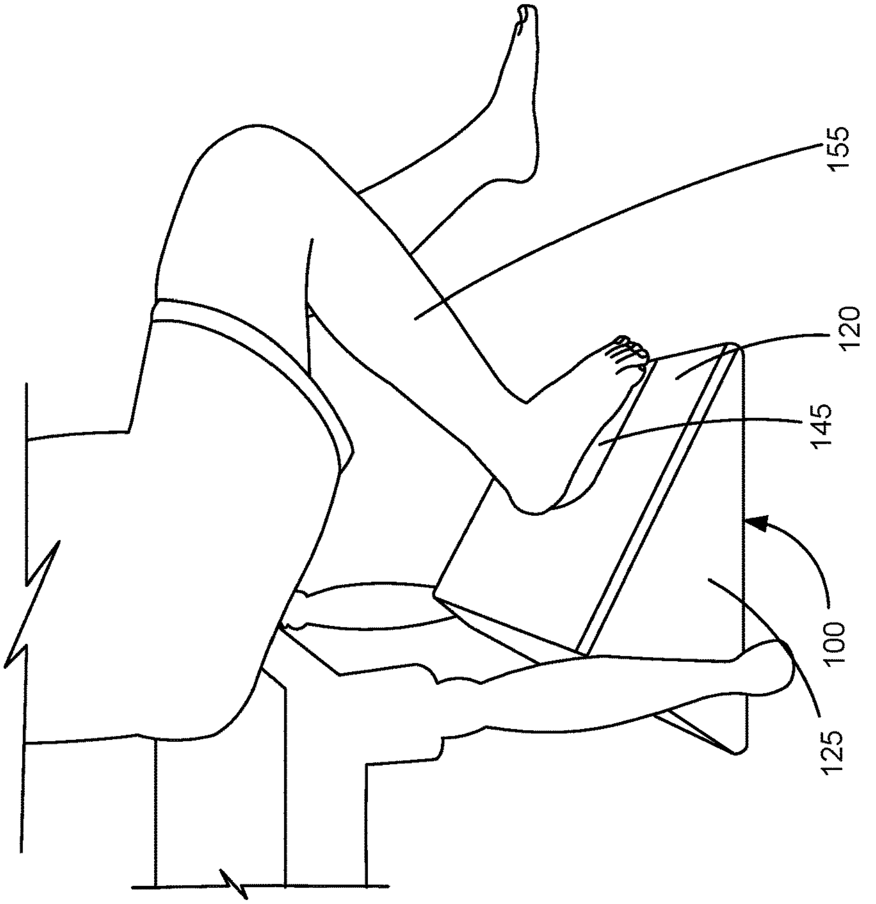
FIG. 15B is a side view of a patient implementing the therapeutic device in a second position of the fourth configuration shown in FIG. 15A according to an embodiment of the present disclosure.
Figure 15A:
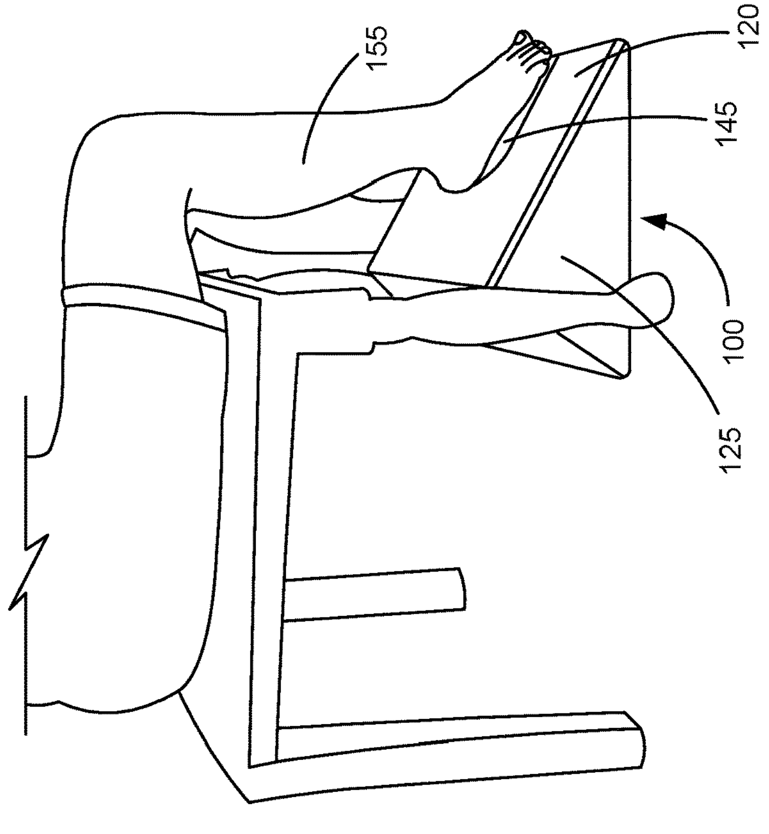
FIG. 15A is a side view of a patient implementing the therapeutic device in a first position of a fourth configuration according to an embodiment of the present disclosure.

FIG. 15A is a side view of a patient implementing the therapeutic device 100 in a fourth configuration according to an embodiment of the present disclosure. FIG. 15B is a side view of a patient implementing the therapeutic device 100 in a second position of the fourth configuration shown in FIG. 15A according to an embodiment of the present disclosure. In these embodiments, the patient 155 may sit down on a chair or other surface while placing the therapeutic device 100 immediately in front of the chair or other surface. According to this fourth configuration of the therapeutic device 100, the first plane 110 is laid flush with the floor with the third plane 120 facing upwards. In this embodiment, the foot placement identifier 145 is made visible to the patient 155 and the patient may place the sole of the patient's 155 foot to be stretched on the foot placement identifier 145. The patient's 155 foot is pointed in a downward configuration during this stretch. FIG. 15A shows the patient 155 in a resting and pre-stretch position.

As the patient 155 moves forward on the chair or other surface as shown in FIG. 15B, the patient 155 leaves his or her foot on the foot placement identifier 145. Because of the angle of the third plane 120 relative to the first plane 110 and floor is around 30°, the patient 155 may cause, in some embodiments, for the soleus muscles and associated muscles to be stretched. In an embodiment, the patient 155 may move forward from the position shown in FIG. 15A to the position shown in FIG. 15B to perform this stretch a prescribed number of times, for a prescribed number of sets, and for a prescribed number of sessions per day.

Figure 16A:
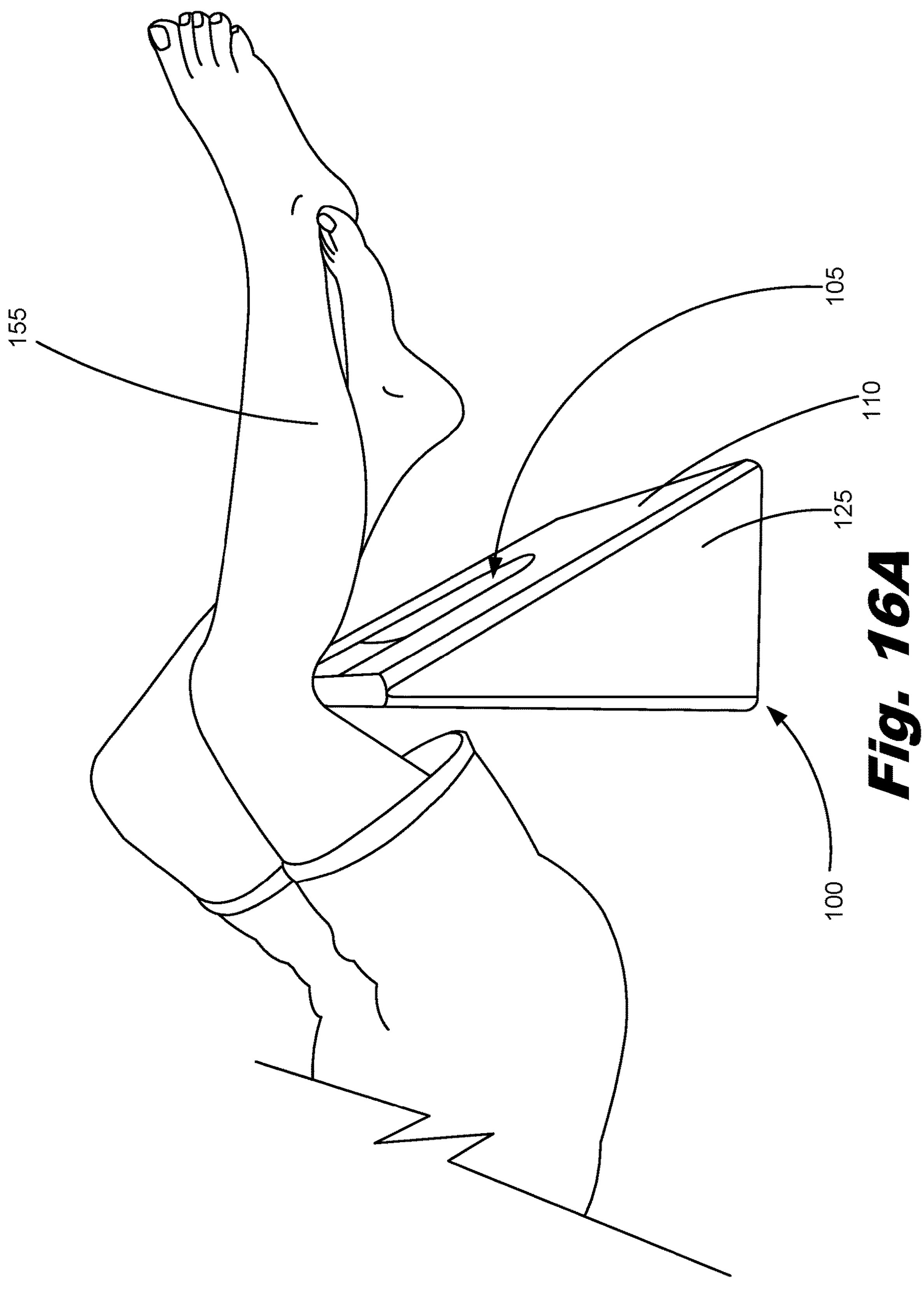
FIG. 16A is a side view of a patient implementing the therapeutic device in a first position of a fifth configuration according to an embodiment of the present disclosure.
Figure 16B:
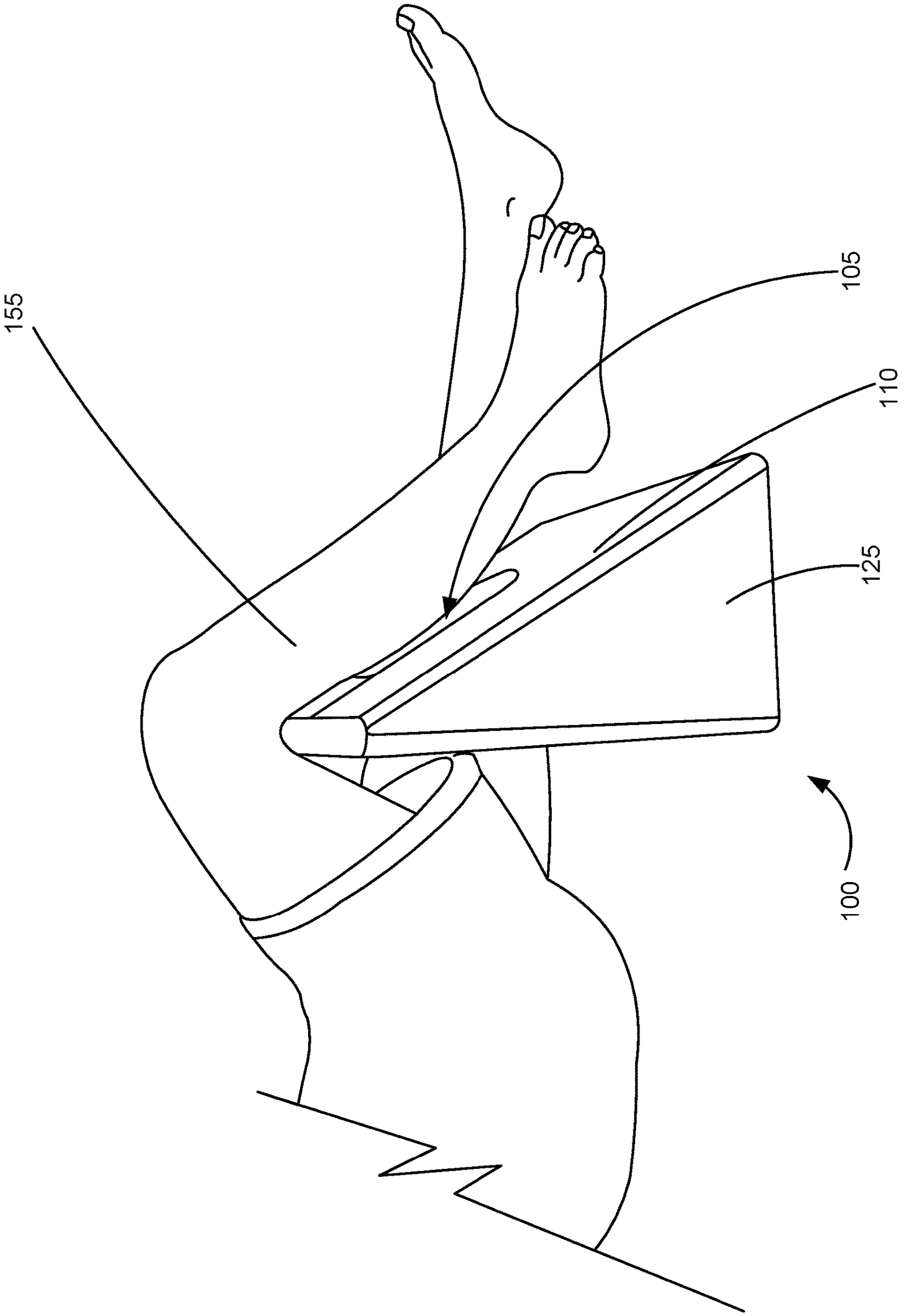
FIG. 16B is a side view of a patient implementing the therapeutic device in a second position of the fifth configuration shown in FIG. 16A according to an embodiment of the present disclosure.

FIG. 16A is a side view of a patient implementing the therapeutic device 100 in a first position of a fifth configuration according to an embodiment of the present disclosure. FIG. 16B is a side view of a patient implementing the therapeutic device 100 in a second position of the fifth configuration shown in FIG. 16A according to an embodiment of the present disclosure. In these embodiments, a strengthening exercise may be conducted via a terminal knee extension. To perform this exercise, the patient 155 may place the fifth plane 130 on the floor with the third plane 120 facing away from the patient 155. In an alternative embodiment, the first plane 110 may be facing away from the patient 155 with the third plane 120 facing toward the patient 155. In this embodiment, the angle of the first plane 110 relative to the third plane 120 prevents the leg of the patient 155 being dropped past 60° from horizontal due to the last 30° of downward movement of the patient's 155 leg being prevented by the body of the therapeutic device 100.

During use, the patient 155 places his or her leg on the corner of the therapeutic device 100 formed between the first plane 110 and the third plane 120. Specifically, the patient 155 may place the back side (posterior) of the patient's 155 knee on the corner of the therapeutic device 100 formed between the first plane 110 and the third plane 120. The patient 155 may move his or her lower leg up so that it is horizontal to the floor and down to the surface of the first plane 110. The movement of the lower leg of the patient 155 may be repeated a prescribed number of times for a prescribed number of sets and for a prescribed number of sessions per day.

Figure 17B:
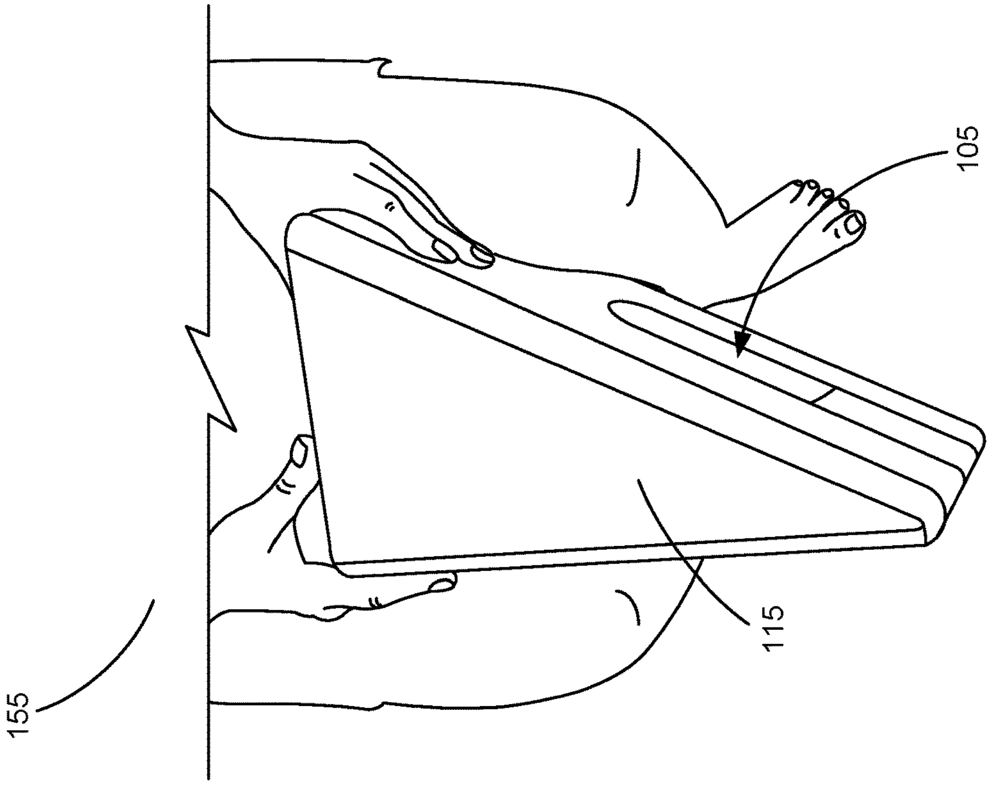
FIG. 17B is a top view of a patient implementing the therapeutic device in a sixth configuration shown in FIG. 11A according to an embodiment of the present disclosure.
Figure 17A:
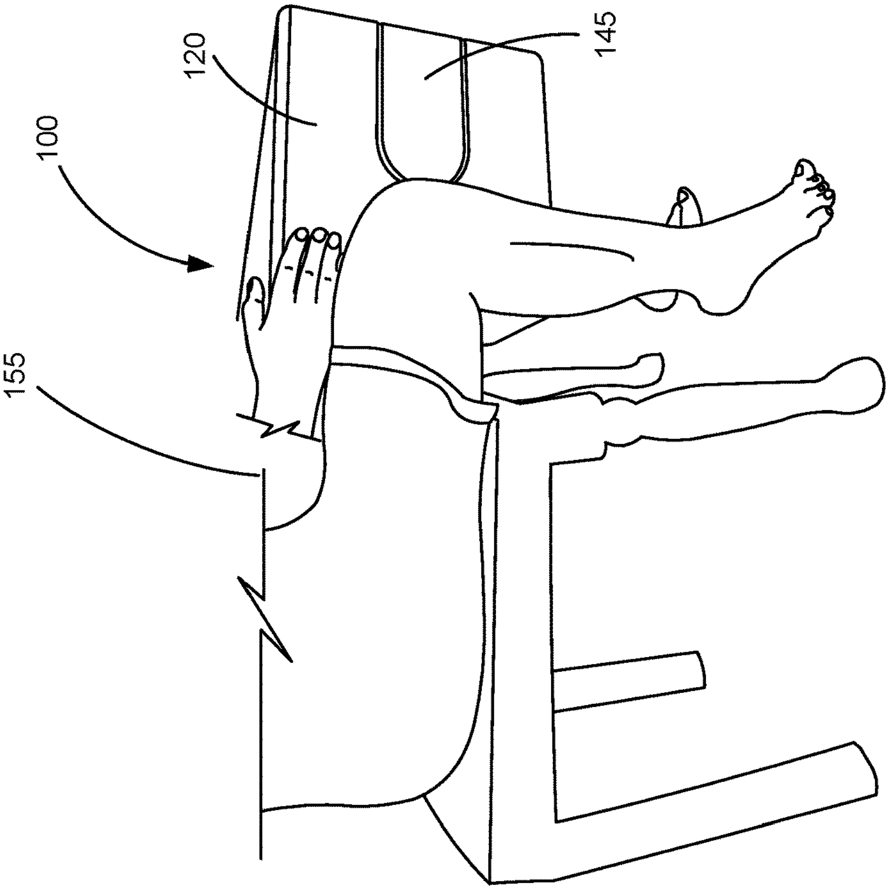
FIG. 17A is a side view of a patient implementing the therapeutic device in a sixth configuration according to an embodiment of the present disclosure.

FIG. 17A is a side view of a patient implementing the therapeutic device 100 in a sixth configuration according to an embodiment of the present disclosure. FIG. 17B is a top view of a patient implementing the therapeutic device 100 in a second position of the sixth configuration shown in FIG. 17A according to an embodiment of the present disclosure. The exercise described in connection with FIGS. 17A and 17B may be completed by a patient 155 to strengthen the patient's 155 hip flexors via an isometric hip adduction exercise. With the therapeutic device 100 placed between the knees of the patient 155, the patient may squeeze his or her knees together as shown in FIG. 17B. The squeezing of the patient's 155 legs together by the patient 155 may be repeated a prescribed number of times for a prescribed number of sets and for a prescribed number of sessions per day.

Figure 18:
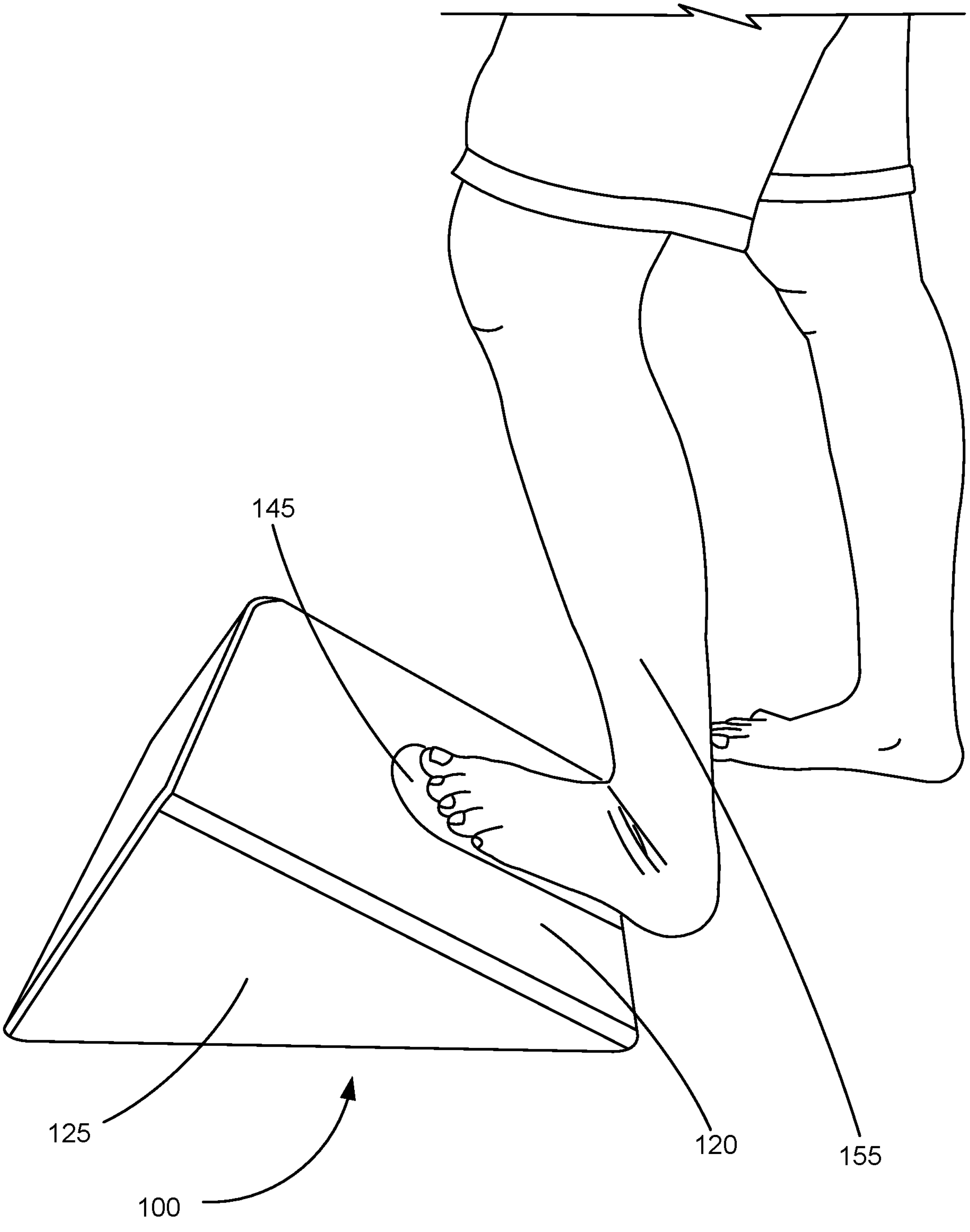
FIG. 18 is a side view of a patient implementing the therapeutic device in a second position of the third configuration show in FIG. 14 according to an embodiment of the present disclosure.

FIG. 18 is a side view of a patient implementing the therapeutic device in a second position of the third configuration show in FIG. 14 according to an embodiment of the present disclosure. Again, with FIG. 2 in mind and looking at FIG. 18, a patient 155 has positioned his or her foot on the foot placement identifier 145 defined on the third plane 120. As described herein, the foot placement identifier 145 may be any visual or tactile indicator such as a different color or texture showing the patient 155 where to place the patient's 155 foot on the third plane 120. In FIG. 18, the fourth plane 125 is viewable with the fifth plane 130 formed at a 90° angle relative to the third plane 120 and fourth plane 125 as described herein.

The angle of deflection of the patient's 155 foot from the floor surface is, in an embodiment, 30°. This is because the first plane 110 is made to abut the surface of the floor and the angle between the first plane 110 and the third plane 120 is 30°. Although the present specification describes this specific angle between the first plane 110 and third plane 120, the present specification contemplates that other angles may be used without going beyond the scope of the principles described herein. In some embodiments, this angle between the first plane 110 and third plane 120 may be increased or decreased and a plurality of therapeutic devices 100 having these different angles may be provided as options to the patient so that a stretch, exercise, or other physical therapy action may be customized to the patient's health needs.

During this exercise and stretch shown in FIG. 18, the patient 155 may bend both knees while advancing his or her upper body forward towards the direction of the patient's 155 toes. By doing so the patient 155 may stretch his or her hamstrings and calf muscles (e.g., gastrocnemius muscles) and specifically the lower calf. In an embodiment, this stretch may be conducted by the patient 155 keeping the sole of his or her foot on the foot placement identifier 145, bending both knees, turning slightly out from the placed foot, and leaning forward towards the therapeutic device 100 until the stretch is felt in the calf muscles. This may allow for the patient 155 to engage in lower leg exercises with a musculature prepared for such activities especially after a knee or leg surgery. The leaning by the patient 155 may be repeated a prescribed number of times for a prescribed number of sets and for a prescribed number of sessions per day.

Figure 19:
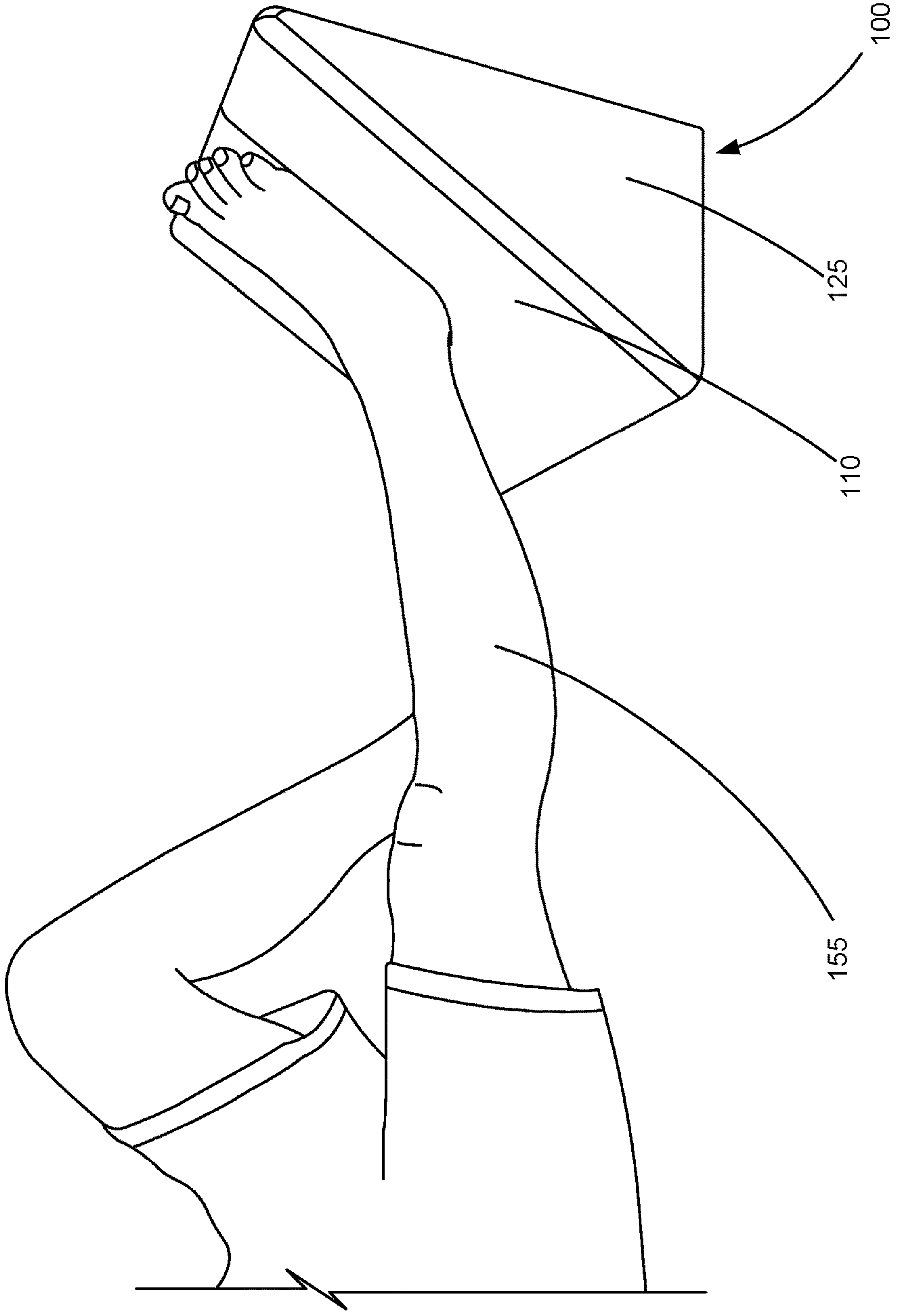
FIG. 19 is a side view of a patient implementing the therapeutic device in a seventh configuration according to an embodiment of the present disclosure.

FIG. 19 is a side view of a patient implementing the therapeutic device 100 in a seventh configuration according to an embodiment of the present disclosure. As described herein, the patient 155 may sit in the floor and place the therapeutic device 100 on the floor. In an alternative embodiment, the patient 155 may place the therapeutic device 100 on a chair and place the therapeutic device 100 on another surface such as another chair or ottoman. In this specific embodiment, the use of the chair and ottoman may alleviate a patient 155 from having to get back up off the floor if elderly or recovering from a major surgery for which the physical therapy is being conducted.

In either embodiment, the patient 155 may then extend the operative leg towards the therapeutic device 100 such that the patient's 155 heel is placed into the heel placement depression 105 with the back of the heel abutting the heel cup 140 and the bottom of the heel and sole of the foot abutting the heel plane 135 as described herein. During this time, the patient 155 may perform a stretch such that the patient's 155 leg is made to be about horizontal to the floor. During this time, the patient 155 is prevented from rotating his or her leg by the heel placement depression 105 and specifically the heel cup 140. This causes the patient 155 to consistently perform the knee extension exercise and stretch, for example, as recommended by physical therapists.

In a specific example, the patient 155 may be directed by a physical therapist to place the patient's 155 foot into the heel placement depression 105 as described. The patient 155 may then place a force at the knee of the patient 155. Because the heel placement depression 105 is formed into the therapeutic device 100 with a portion of the therapeutic device 100 formed between the heel placement depression 105 and the floor, the patient's 155 leg is slightly raised above the ground. This allows for a slight deformation of the patient's 155 leg toward the ground. In an alternative embodiment, the patient 155 may be directed by the physical therapist to place a certain amount of weight on the knee or slightly superior relative to the knee. The placement of the weight or the force on the knee may be held for a physical therapist-prescribed time. In an embodiment, the placement of the weight or force on the knee may be repeated for a number of prescribed times for or a number of prescribed sets for a number of prescribed sessions per day according to the physical therapist's prescription.

As described, the heel placement depression 105 is formed into the therapeutic device 100 with a portion of the therapeutic device 100 formed between the heel placement depression 105 and the floor, the patient's 155 leg is slightly raised above the ground. The thickness of the portion of the therapeutic device 100 between the patient's 155 heel and the floor is greater than that portion of the therapeutic device 100 between the patient's 155 heel and the floor as shown in FIG. 12. This is because, in FIG. 19, the therapeutic device 100 has been placed in the eighth configuration. That eighth configuration includes the first plane 110 facing the patient 155 and the fifth plane 130 abutting the floor.

Figure 20:
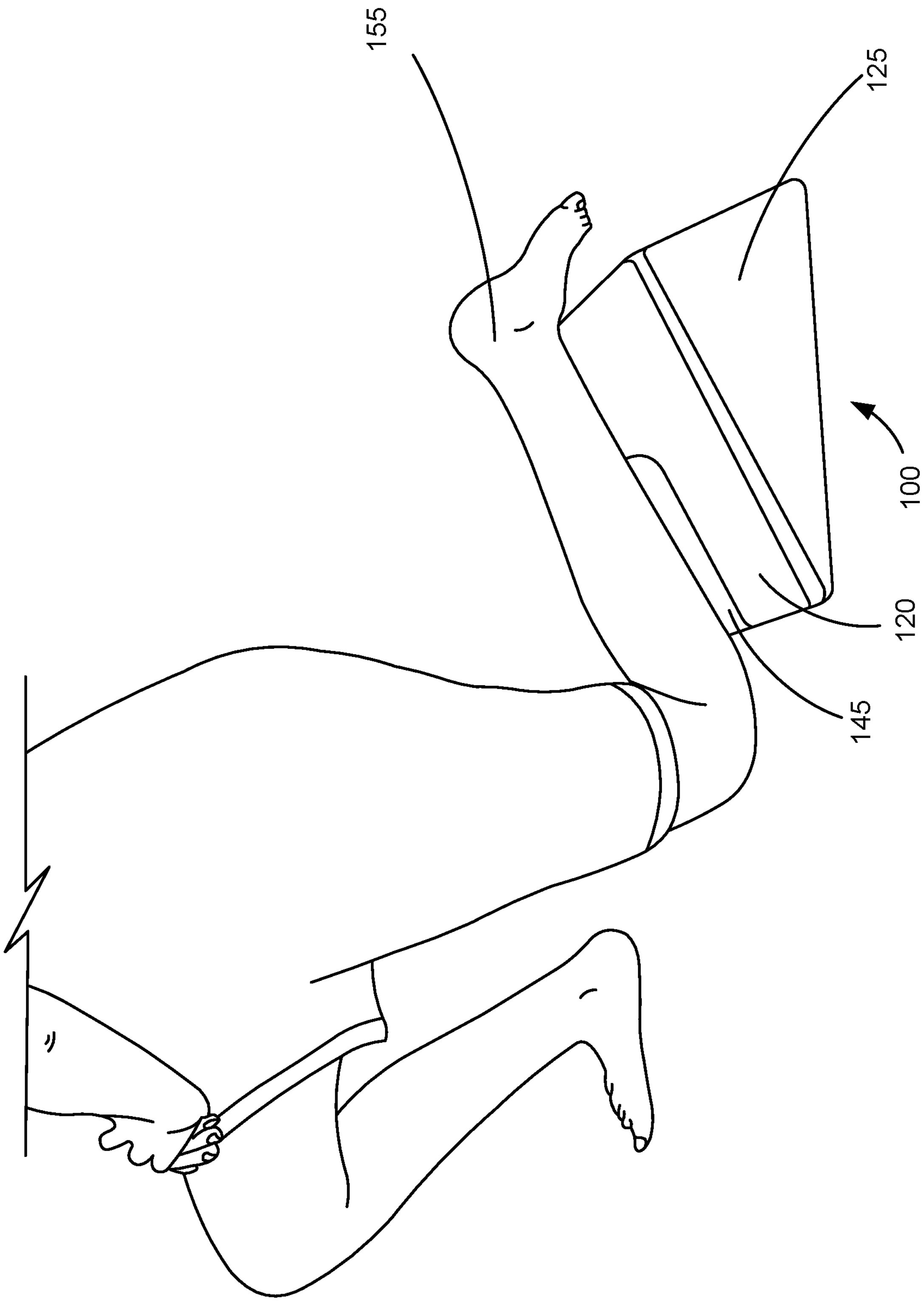
FIG. 20 is a side view of a patient implementing the therapeutic device in an eight configuration according to an embodiment of the present disclosure.

FIG. 20 is a side view of a patient implementing the therapeutic device 100 in an eighth configuration according to an embodiment of the present disclosure. In this configuration, the first plane 110 of the therapeutic device 100 is abutting the floor while the third plane 120 is in contact with an anterior portion of the lower portion of the patient's 155 leg. In this position the patient 155 may extend the other leg out for support, resting his or her hands on the extended leg. This position may place the patient 155 in a position to perform a quadricep stretch. In this position the patient 155 may shift his or her hips forward to perform this stretch. The angel of the first plane 110 relative to the third plane 120 may cause more of a stretch on the quadriceps than otherwise realized. The leaning by the patient 155 forward with the therapeutic device 100 in this ninth configuration may be repeated a prescribed number of times for a prescribed number of sets and for a prescribed number of sessions per day.

Figure 21:
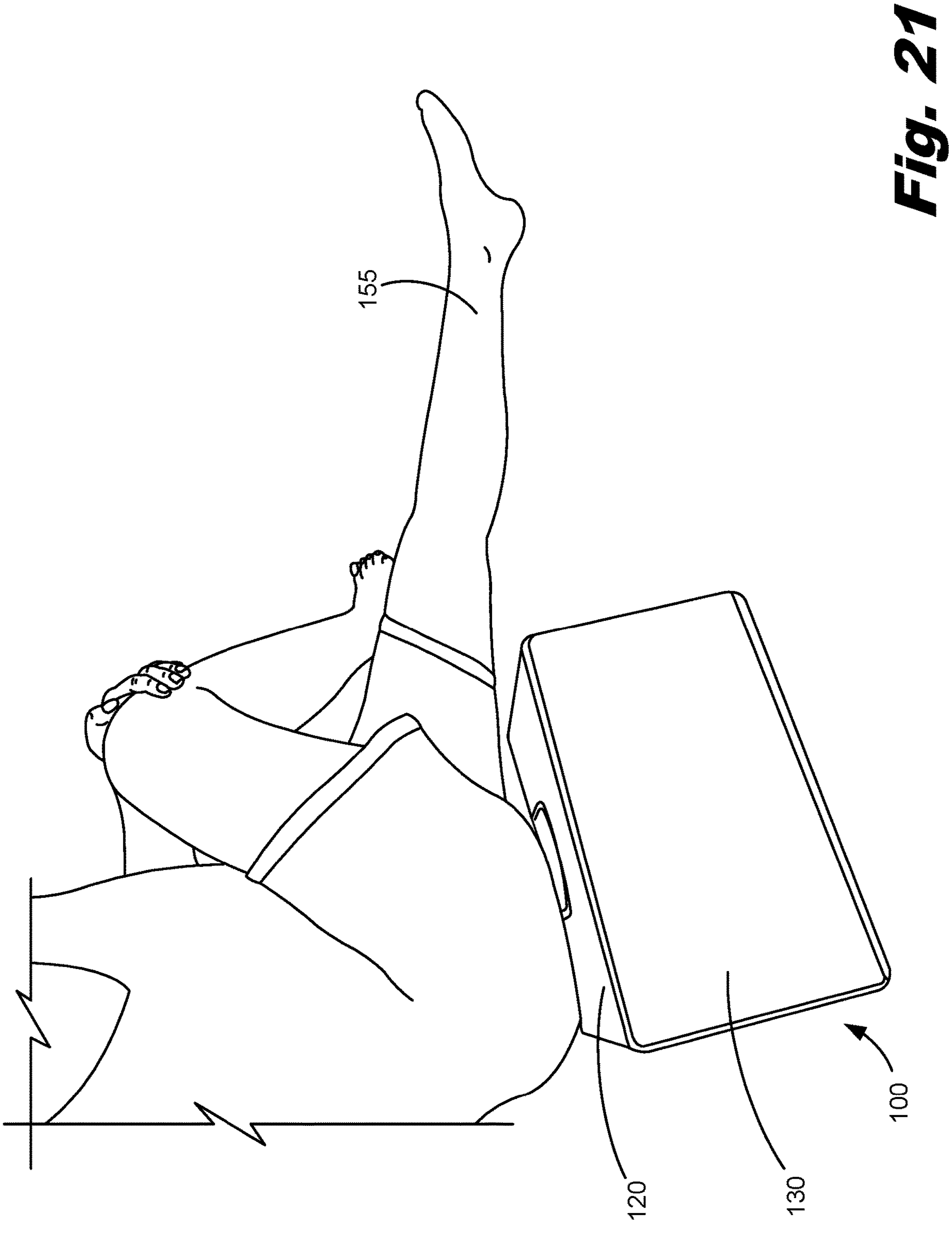
FIG. 21 is a side view of a patient implementing the therapeutic device in a ninth configuration according to an embodiment of the present disclosure.

FIG. 21 is a side view of a patient implementing the therapeutic device 100 in a ninth configuration according to an embodiment of the present disclosure. In this tenth configuration, the first plane 110 of the therapeutic device 100 is abutting the floor with the third plane 120 facing the patient 155. The patient 155 has placed one buttocks on the third plane 120 while extending an opposite leg out. The other leg may be draped across the opposite extended leg to perform a back hamstring stretch. The same stretching may be completed with the other buttocks placed on the therapeutic device 100 in order to stretch the other back hamstring. This stretching with the therapeutic device 100 in this tenth configuration may be repeated a prescribed number of times for a prescribed number of sets and for a prescribed number of sessions per day.

The therapeutic device 100 described herein may be used as a post-operative rehabilitation device that improves outcomes concerning the functional level of a patient following any orthopedic knee surgery, for example. The therapeutic device 100 will increase the range of motion/flexibility for flexion and extension of a knee joint. Additionally, the therapeutic device 100 may be used by the patient to strengthen the lower extremity with a focus on quad control and activation.

Still further, the therapeutic device 100 may help the patient perform post-surgical exercises properly so as to maximize the patient's optimal functional level. The therapeutic device 100 is designed, in a specific embodiment, to perform all of the patient's post-operation stretching and exercise program, while decreasing the chance of human error in the performance of their program.

The benefits of the therapeutic device 100 may be threefold: the patients will find greater result and functional levels; the doctors/therapists will see more consistency concerning the outcomes of their patients; and the insurance companies/payer may see decreased visits to reach functional levels which will save money for the insurance companies/payers.

Any methods disclosed herein includes one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the technology.

While specific embodiments and applications of the present technology have been illustrated and described, it is to be understood that the technology is not limited to the precise configuration and components disclosed herein. Various modifications, changes, and variations which will be apparent to those skilled in the art may be made in the arrangement, operation, and details of the methods and systems of the present technology disclosed herein without departing from the spirit and scope of the technology.

The invention claimed is:

1. A therapeutic system comprising:

a triangular prism-shaped body;

a heel placement depression formed in a first plane of the triangular prism-shaped body to receive a patient's foot;

a foot placement identifier placed on a third plane of the triangular prism-shaped body; and a heel plane formed into the heel placement depression, the heel plane being parallel to a third plane of the triangular prism-shaped body.

2. The therapeutic system of claim 1 further comprising:

a heel cup formed into the heel placement depression, the heel cup forming a 92° angle relative to a heel plane formed into the heel placement depression.

3. The therapeutic system of claim 1, wherein the foot placement identifier includes a different textured surface from a remaining portion of the triangular prism-shaped body.

4. The therapeutic system of claim 1, wherein the foot placement identifier includes a different colored surface from a remaining portion of the triangular prism-shaped body.

5. The therapeutic system of claim 1, wherein the heel placement depression is formed within the triangular prism-shaped body with a heel plane being parallel with a third plane of the triangular prism-shaped body and placed at a distance of two inches from the third plane.

6. The therapeutic system of claim 1, wherein the heel placement depression is formed within the triangular prism-shaped body and sized similar to an outline of the foot placement identifier with a central point of a heel cup of the heel placement depression and a central point of the foot placement identifier formed 5.55 inches from an edge between a third plane and a first plane of the triangular prism-shaped body.

7. The therapeutic system of claim 1 further comprising:

a leg depression formed in an edge of the triangular prism-shaped body;

the edge the leg depression is formed in being an edge formed between a third plane and a fifth plane of the triangular prism-shaped body.

8. A therapeutic system comprising:

a triangular prism-shaped body, the triangular prism-shaped body comprising:

a first rectangle-shaped plane;

a second triangular-shaped plane placed at a 90° angle relative to a first side of the first plane;

a third rectangular-shaped plane placed at a 30° angle relative to a second side of the first plane;

a fourth triangular-shaped plane placed at a 90° angle relative to a third side of the first plane; and a fifth rectangular-shaped plane placed at a 60° angle relative to a fourth side of the first plane;

a heel placement depression formed in the first rectangle-shaped plane to receive a patient's foot, the heel placement depression including a heel plane formed into the heel placement depression, the heel plane being parallel to the third rectangular-shaped plane of the triangular prism-shaped body; and a foot placement identifier formed on the third rectangular-shaped plane originating at the joint of the first rectangular-shaped plane and third rectangular-shaped plane and extending into the third rectangular-shaped plane.

9. The therapeutic system of claim 8 further comprising:

a heel cup formed into the heel placement depression, the heel cup forming a 92° angle relative to a heel plane formed into the heel placement depression.

10. The therapeutic system of claim 8, wherein the foot placement identifier includes a different textured surface from a remaining portion of the triangular prism-shaped body.

11. The therapeutic system of claim 8, wherein the foot placement identifier includes a different colored surface from a remaining portion of the triangular prism-shaped body.

12. The therapeutic system of claim 8, wherein the heel placement depression is formed within the triangular prism-shaped body with a heel plane being parallel with the third rectangular-shaped plane of the triangular prism-shaped body and placed at a distance of two inches from the third rectangular-shaped plane.

13. The therapeutic system of claim 8, wherein the heel placement depression is formed within the triangular prism-shaped body and sized similar to an outline of the foot placement identifier with a central point of a heel cup of the heel placement depression and a central point of the foot placement identifier formed 5.55 inches from an edge between the third rectangular-shaped plane and the first rectangular-shaped plane of the triangular prism-shaped body.

14. The therapeutic system of claim 8 further comprising:

a leg depression formed in an edge of the triangular prism-shaped body;

the edge the leg depression is formed in being an edge formed between the third rectangular-shaped plane and the fifth rectangular-shaped plane of the triangular prism-shaped body.

15. A prism-shaped therapeutic device, comprising:

a triangular prism-shaped body, the triangular prism-shaped body comprising:

a first rectangle-shaped plane;

a second triangular-shaped plane placed at a 90° angle relative to a first side of the first plane;

a third rectangular-shaped plane placed at a 30° angle relative to a second side of the first plane;

a fourth triangular-shaped plane placed at a 90° angle relative to a third side of the first plane; and a fifth rectangular-shaped plane placed at a 60° angle relative to a fourth side of the first plane;

a heel placement depression formed in the first rectangle-shaped plane to receive a patient's foot, the heel placement depression including a heel plane formed into the heel placement depression, the heel plane being parallel to the third rectangular-shaped plane of the triangular prism-shaped body;

a foot placement identifier formed on the third rectangular-shaped plane originating at the joint of the first rectangular-shaped plane and third rectangular-shaped plane and extending into the third rectangular-shaped plane; and a leg depression formed in an edge of the triangular prism-shaped body.

16. The prism-shaped therapeutic device of claim 15, wherein the edge the leg depression is formed in being an edge formed between the third rectangular-shaped plane and the fifth rectangular-shaped plane of the triangular prism-shaped body.

17. The prism-shaped therapeutic device of claim 15, wherein the foot placement identifier includes a different textured surface from a remaining portion of the triangular prism-shaped body.

18. The prism-shaped therapeutic device of claim 15, wherein the heel placement depression is formed within the triangular prism-shaped body with a heel plane being parallel with the third rectangular-shaped plane of the triangular prism-shaped body and placed at a distance of two inches from the third rectangular-shaped plane.

19. The therapeutic system of claim 5, wherein the distance between the heel plane and the third plane is two inches.

20. The therapeutic system of claim 8, wherein the distance between the heel plane and the third plane is two inches.

* * * * *